(12) United States Patent
Choi

(10) Patent No.: US 11,472,271 B2
(45) Date of Patent: Oct. 18, 2022

(54) LINK MECHANISM FOR VEHICLE DOOR AND VEHICLE DOOR OPENING AND CLOSING APPARATUS HAVING THE SAME

(71) Applicants: Hyundai Motor Company, Seoul (KR); Kia Motors Corporation, Seoul (KR)

(72) Inventor: Je Won Choi, Anyang Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 231 days.

(21) Appl. No.: 16/890,635

(22) Filed: Jun. 2, 2020

(65) Prior Publication Data

US 2021/0140216 A1 May 13, 2021

(30) Foreign Application Priority Data

Nov. 12, 2019 (KR) .................... 10-2019-0144599

(51) Int. Cl.
| | | |
|---|---|---|
| *B60J 5/04* | (2006.01) | |
| *E05D 15/522* | (2006.01) | |
| *B60J 5/06* | (2006.01) | |
| *E05D 15/58* | (2006.01) | |
| *E05D 15/48* | (2006.01) | |

(52) U.S. Cl.
CPC ............... *B60J 5/047* (2013.01); *B60J 5/06* (2013.01); *E05D 15/522* (2013.01); *E05D 15/58* (2013.01); *E05D 2015/485* (2013.01); *E05Y 2900/531* (2013.01)

(58) Field of Classification Search
None
See application file for complete search history.

(56) References Cited

U.S. PATENT DOCUMENTS

| | | | | |
|---|---|---|---|---|
| 5,921,613 | A * | 7/1999 | Breunig .................... | B60J 5/06 296/146.12 |
| 6,161,336 | A * | 12/2000 | Ziv-Av .................... | E05D 15/58 49/260 |
| 6,183,039 | B1 * | 2/2001 | Kohut ................. | E05D 15/1081 296/146.12 |
| 6,290,283 | B1 * | 9/2001 | Fukumoto ............. | B60R 16/027 49/213 |
| 6,793,268 | B1 * | 9/2004 | Faubert ..................... | B60J 5/06 296/146.12 |

(Continued)

FOREIGN PATENT DOCUMENTS

| | | | | | |
|---|---|---|---|---|---|
| KR | 101684536 | B1 * | 5/2011 | ............. | E05D 15/48 |
| KR | 20110053008 | A * | 5/2011 | ............. | E05D 15/48 |
| KR | 1020210057616 | A | 5/2021 | | |

*Primary Examiner* — Marcus Menezes
(74) *Attorney, Agent, or Firm* — Fox Rothschild LLP

(57) ABSTRACT

A link mechanism for a vehicle door is provided. The link mechanism includes a body having a first end portion facing a vehicle body and a second end portion facing a vehicle door and a first mounting member that is mounted on the vehicle body, and rotatably connected to the first end portion of the body through a first shaft. A second mounting member is mounted on the vehicle door, and is rotatably connected to the second end portion of the body through a second shaft. A rotation restricting unit selectively restricts a rotation of the second mounting member.

12 Claims, 23 Drawing Sheets

(56) References Cited

U.S. PATENT DOCUMENTS

| | | | | |
|---|---|---|---|---|
| 8,234,816 B2* | 8/2012 | Heuel | ............... | E05D 3/127 |
| | | | | 49/211 |
| 10,384,519 B1* | 8/2019 | Brown | ............... | B60J 5/047 |
| 10,676,974 B2* | 6/2020 | Wojdyla | ............. | A61G 3/061 |
| 2006/0059783 A1* | 3/2006 | Braun | ............... | E05B 83/40 |
| | | | | 49/360 |
| 2007/0096504 A1* | 5/2007 | Kothe | ............... | E05B 79/20 |
| | | | | 296/155 |
| 2009/0230724 A1* | 9/2009 | Fischer | ............... | B60J 5/06 |
| | | | | 296/146.5 |
| 2010/0301631 A1* | 12/2010 | Scott | ............ | E05D 3/127 |
| | | | | 296/146.12 |
| 2012/0031004 A1* | 2/2012 | Boettcher | ............ | E05D 15/101 |
| | | | | 49/154 |
| 2013/0186002 A1* | 7/2013 | Mather | ............... | B60J 5/06 |
| | | | | 49/404 |
| 2013/0205668 A1* | 8/2013 | Neag | ................ | B60J 10/86 |
| | | | | 16/94 R |
| 2016/0272054 A1* | 9/2016 | Maruyama | ............ | B60J 5/06 |
| 2016/0356069 A1* | 12/2016 | Choi | ............ | F16H 19/06 |
| 2018/0087304 A1* | 3/2018 | Bauer | ............ | E05D 15/1047 |
| 2018/0119465 A1* | 5/2018 | Wojdyla | ............ | E05D 15/30 |
| 2021/0140215 A1 | 5/2021 | Choi | | |
| 2021/0277695 A1* | 9/2021 | Bakker | ............ | E05D 15/30 |

* cited by examiner

LINK MECHANISM FOR VEHICLE DOOR AND VEHICLE DOOR OPENING AND CLOSING APPARATUS HAVING THE SAME

CROSS-REFERENCE TO RELATED APPLICATION

This application is based on and claims the benefit of priority to Korean Patent Application No. 10-2019-0144599, filed on Nov. 12, 2019, the disclosure of which is incorporated herein in its entirety by reference.

TECHNICAL FIELD

The present disclosure relates to a link mechanism for a vehicle door and a vehicle door opening and closing apparatus having the same, and more particularly, to a link mechanism for a vehicle door and a vehicle door opening and closing apparatus having the same, capable of selectively varying a movement path of the vehicle door.

BACKGROUND

As is well known, vehicles have a variety of door apertures/openings for ingress and egress of vehicle passengers, loading and unloading of luggage, replacement and repair of components, and the like. A vehicle door is closed to block the door aperture and is opened to enable ingress and egress of passengers. There are various types of designs for vehicle doors such as side doors, a tailgate, a litigate, and a hood. The vehicle doors may be movably connected to a vehicle body using a link mechanism such as a hinge assembly and a roller assembly.

The vehicle doors are divided into swing doors using the hinge assembly and sliding doors using the roller assembly. The swing door is opened and closed by swinging around a hinge mounted between the swing door and the vehicle body. The sliding door is opened and closed by sliding a roller mounted on the sliding door along a rail mounted on the vehicle body.

The swing door is relatively easy to open and close, thereby enabling quick ingress and egress of passengers. However, when the swing door is opened, a space for ingress and egress is relatively small. When the vehicle is located in a narrow space, a swing trajectory of the door is not secured, which makes the opening and closing operation thereof difficult. The sliding door is substantially easy to open and close even when the vehicle is located in a narrow space. When the sliding door is opened, a space for ingress and egress is relatively large.

However, the sliding door requires a substantial amount force and time to open and close, which hinders quick ingress and egress of passengers. The hinge assembly of the swing door restricts a movement path of the vehicle door to a swing path, and the roller assembly of the sliding door restricts the movement path of the vehicle door to a sliding path.

The above information described in this section is merely provided to assist in understanding the background of the inventive concept, and may include any technical concept which is not considered as the prior art that is already known to those skilled in the art.

SUMMARY

The present disclosure provides a link mechanism for a vehicle door and a vehicle door opening and closing apparatus having the same, capable of selectively varying a movement path of the vehicle door.

According to an aspect of the present disclosure, a link mechanism for a vehicle door may include: a body having a first end portion facing a vehicle body and a second end portion facing a vehicle door; a first mounting member mounted on the vehicle body, and rotatably connected to the first end portion of the body through a first shaft; a second mounting member mounted on the vehicle door, and rotatably connected to the second end portion of the body through a second shaft; and a rotation restricting unit configured to selectively restrict a rotation of the second mounting member.

The rotation restricting unit may include a restricting element that releasably holds the second mounting member, and the restricting element may move between an engaging position in which the restricting element engages with the second mounting member and a release position in which the restricting element releases the second mounting member. The restricting element may be pivotally mounted on the body by a pivot pin, and the restricting element may be biased toward the engaging position by a torsional biasing element.

The second mounting member may include a plurality of recesses, and the restricting element may have a plurality of projections releasably fitted into the plurality of recesses. The body may further include a first damper and a second damper spaced apart from each other to restrict a range of rotation of the second mounting member. The restricting element may be slidably mounted on the body to advance toward the second mounting member or be reversed from the second mounting member, and the restricting element may be biased toward the engaging position by a longitudinal biasing element.

According to another aspect of the present disclosure, a vehicle door opening and closing apparatus may include: a vehicle door; a rail mounted on a vehicle body; and a link mechanism connecting the vehicle body and the vehicle door, and allowing the vehicle door to open and close in one mode selected from sliding mode, in which the vehicle door slides along the rail, and swing mode, in which the vehicle door swings in a predetermined position of the rail. The link mechanism may include: a body having a first end portion facing the vehicle body and a second end portion facing the vehicle door; a first mounting member moving along the rail of the vehicle body, and rotatably connected to the first end portion of the body through a first shaft; a second mounting member mounted on the vehicle door, and rotatably connected to the second end portion of the body through a second shaft; and a rotation restricting unit configured to selectively restrict a rotation of the second mounting member.

The link mechanism may have a rotation axis and include a hold lock, and the link mechanism may be releasably held in the predetermined position of the rail by the hold lock. The vehicle door may swing around the rotation axis when the link mechanism is held in the predetermined position of the rail by the hold lock, and the vehicle door may slide along the rail when the link mechanism is released by the hold lock.

The first mounting member may be movably mounted on the vehicle body through rollers, the rollers may be rotatably mounted on the first mounting member, and the rollers may roll along the rail. The rotation axis may be defined by the second shaft. The hold lock may be mounted on the body of the link mechanism. The body may have a pivot lug that protrudes from the first end portion toward the first mounting member, and the pivot lug may be connected to the first mounting member through the first shaft. The first end portion of the body may have a first restricting surface and a second restricting surface which restrict a range of rotation of the first mounting member, and the first restricting surface and the second restricting surface may intersect at a predetermined angle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
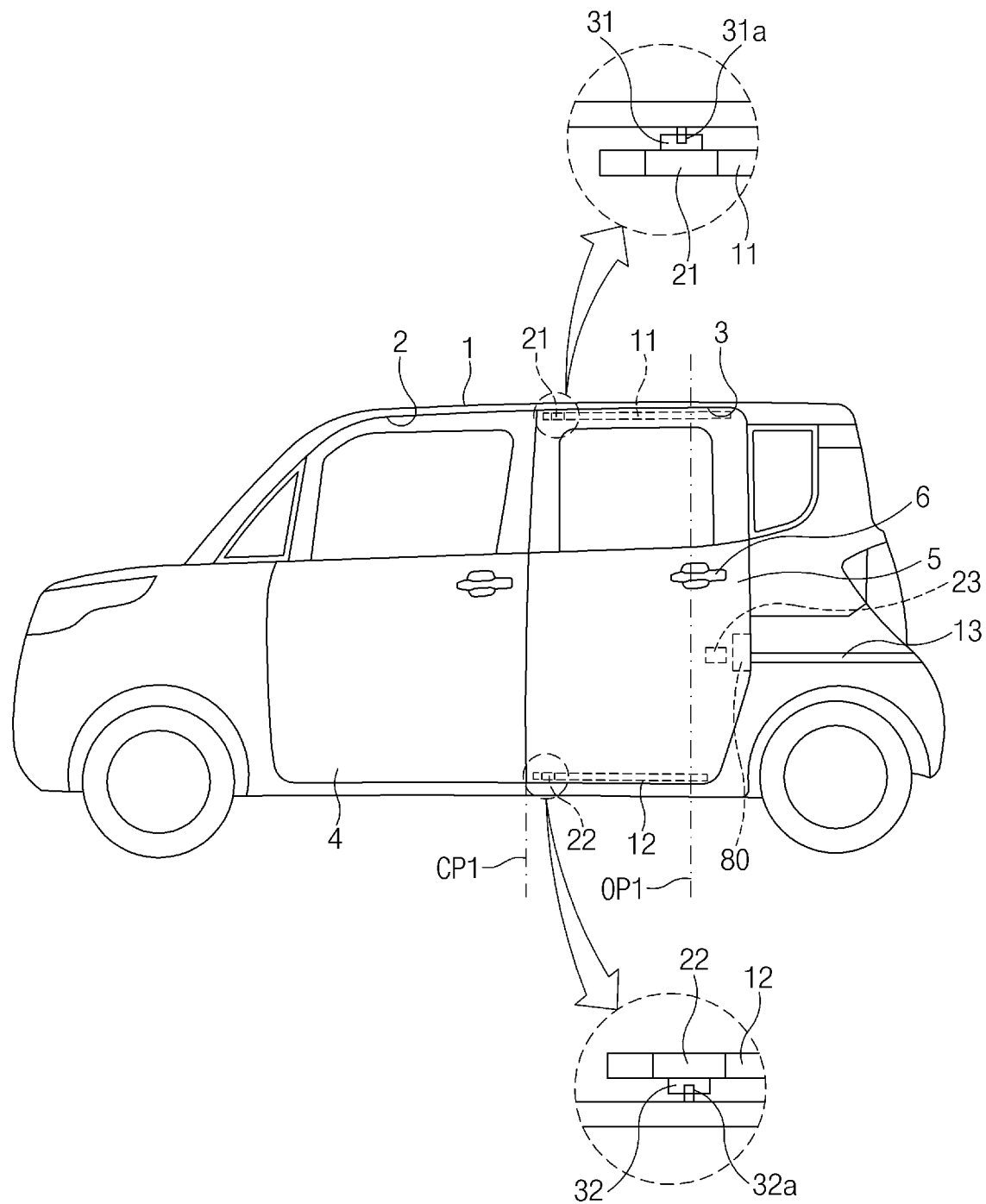
FIG. 1 illustrates a vehicle door opening and closing apparatus according to an exemplary embodiment of the present disclosure, which is mounted on a rear door of a vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplar)/processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinal)/knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A link mechanism for a vehicle door, according to exemplary embodiments of the present disclosure, may allow the vehicle door to be movably connected to a vehicle body. In particular, the link mechanism for a vehicle door, according to exemplary embodiments of the present disclosure, may allow the vehicle door to move along a movement path selected from two or more paths. Thus, the vehicle door may be opened and closed in operating mode corresponding to the selected path.

For example, the movement path of the vehicle door may be selectively determined as one of a sliding path and a swing path by the link mechanism to open and close the vehicle door in any one mode of sliding mode and swing mode. The sliding path may be a path along which the vehicle door slides in a longitudinal direction of the vehicle body, and the sliding mode may allow the vehicle door to open and close along the sliding path. The swing path may be a path along which the vehicle door swings, and the swing mode may allow the vehicle door to open and close along the swing path.

Referring to FIG. 1, a vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 that covers the front aperture 2, and a rear door 5 that covers the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

A vehicle door opening and closing apparatus, according to exemplary embodiments of the present disclosure, may be applied to the front door 4, the rear door 5, and the like. FIGS. 1 to 16 illustrate a vehicle door opening and closing apparatus according to exemplary embodiments of the present disclosure, which is applied to the rear door 5. Hereinafter, the rear door 5 will be referred to as the vehicle door 5, and the rear aperture 3 will be referred to as the door aperture 3. The vehicle door opening and closing apparatus according to exemplary embodiments of the present disclosure may also be applied to the front door 4.

The vehicle door opening and closing apparatus according to exemplary embodiments of the present disclosure may include one or more rails 11 and 12 mounted on the vehicle body 1, and one or more rails 11 and 12 may extend in the longitudinal direction of the vehicle. Referring to FIG. 1, an upper rail 11 may be mounted on an upper edge of the vehicle body 1, and a lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus according to exemplary embodiments of the present disclosure may include link mechanisms 21 and 22 that connect the vehicle door 5 to the rails 11 and 12 of the vehicle body 1. The link mechanisms 21 and 22 may be guided along the rails 11 and 12 and may allow the vehicle door 5 to open and close in one mode selected from the sliding mode and the swing mode. In particular, the link mechanisms 21 and 22 may be releasably held in predetermined positions of the rails 11 and 12 by hold locks 31 and 32. When the link mechanisms 21 and 22 are held in the predetermined positions of the rails 11 and 12 by the hold locks 31 and 32, the vehicle door 5 may be opened and closed in the swing mode in which the vehicle door 5 swings in the predetermined positions of the rails 11 and 12. When the link mechanisms 21 and 22 are released by the hold locks 31 and 32, the vehicle door 5 may be opened and closed in the sliding mode in which the vehicle door 5 slides along the rails 11 and 12.

Figure 2:
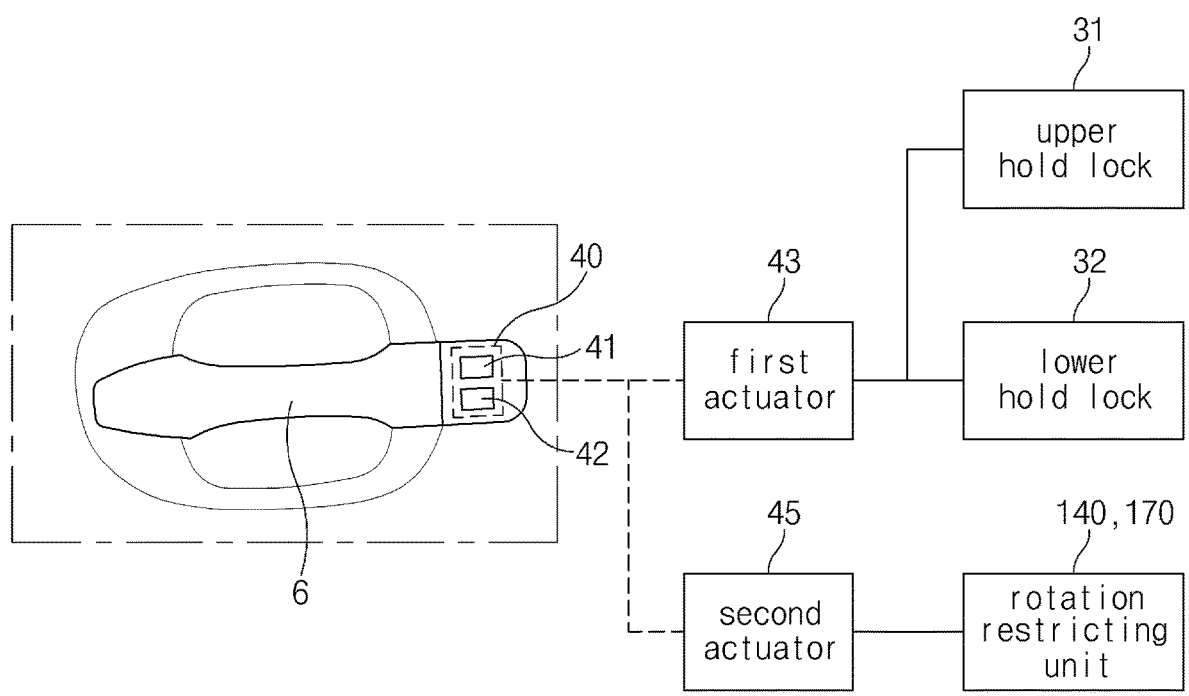
FIG. 2 illustrates the configuration of a selector adjacent to an outside handle of a vehicle, actuators connected to the selector, hold locks, and a rotation restricting unit according to an exemplary embodiment of the present disclosure.
Figure 3:
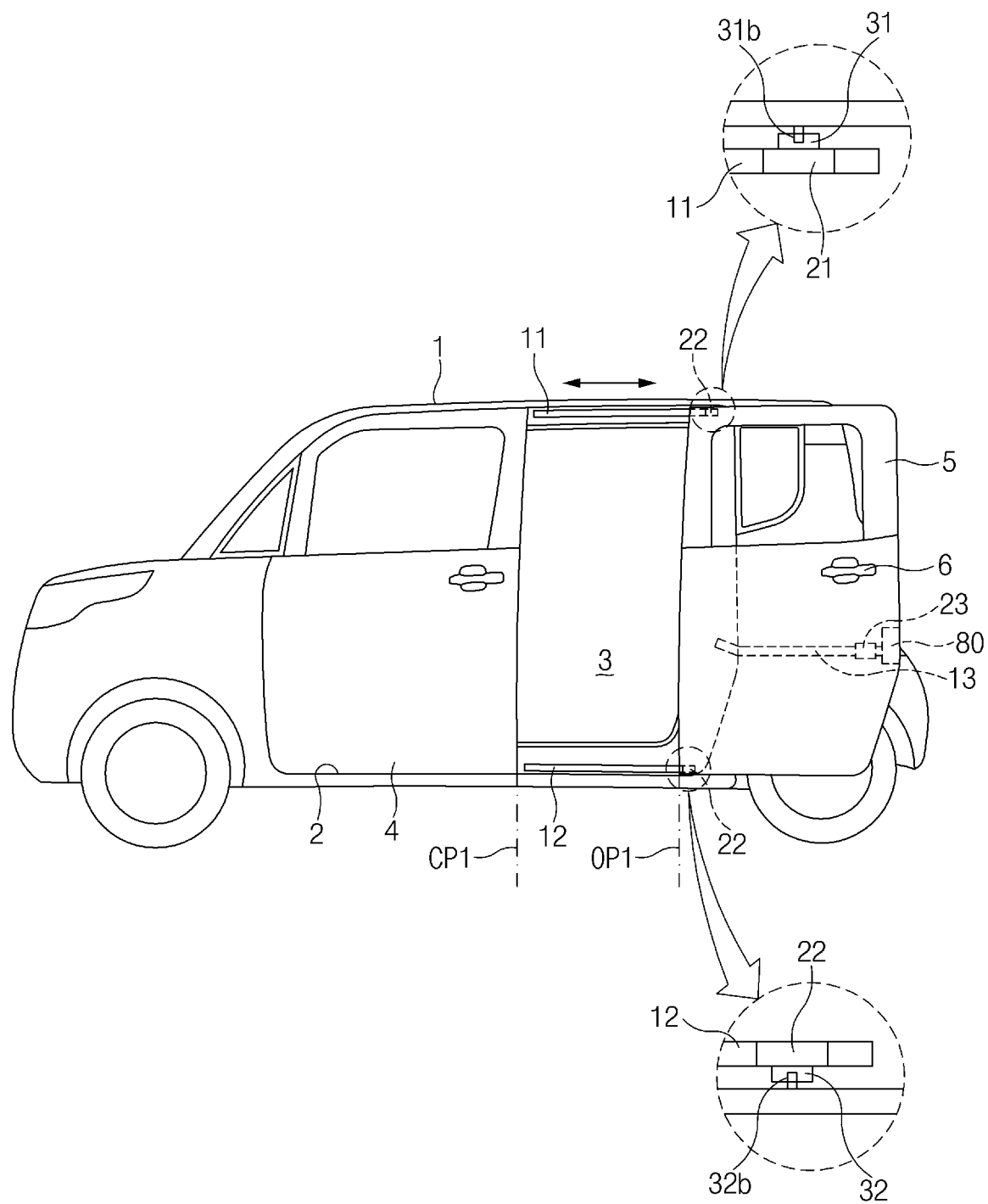
FIG. 3 illustrates a state in which the door of FIG. 1 is opened in sliding mode according to an exemplary embodiment of the present disclosure.

Referring to FIGS. 1 and 3, an upper link mechanism 21 may be mounted on an upper end of the vehicle door 5, and the upper link mechanism 21 may slide along the upper rail 11. A lower link mechanism 22 may be mounted on a lower end of the vehicle door 5, and the lower link mechanism 22 may slide along the lower rail 12. Referring to FIG. 2, the vehicle door 5 may include an outside handle 6, and a selector 40 for selecting the sliding mode and the swing mode may be adjacent to the outside handle 6. The selector 40 may have a first switch 41 for selecting the sliding mode, and a second switch 42 for selecting the swing mode.

When a user presses or otherwise engages the first switch 41 and the sliding mode is selected, the vehicle door 5 may slide along the upper rail 11, the lower rail 12, and a center rail 13 as illustrated in FIG. 3 as the user pushes the outside handle 6 toward the front of the vehicle or pulls the outside handle 6 toward the rear of the vehicle. In the sliding mode, the vehicle door 5 may move between a first open position OP1 in which the vehicle door 5 is fully opened and a first closed position CP1 in which the vehicle door 5 is fully closed, as illustrated in FIGS. 1 and 3.

Figure 4:
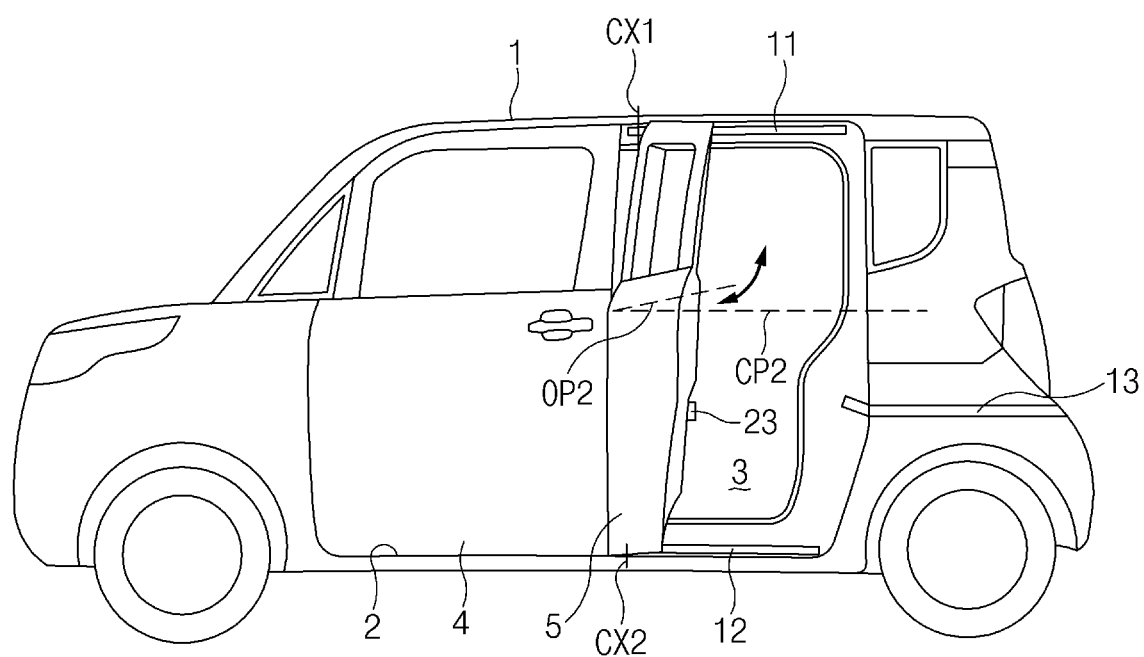
FIG. 4 illustrates a state in which the door of FIG. 1 is opened in swing mode according to an exemplary embodiment of the present disclosure.
Figure 6:
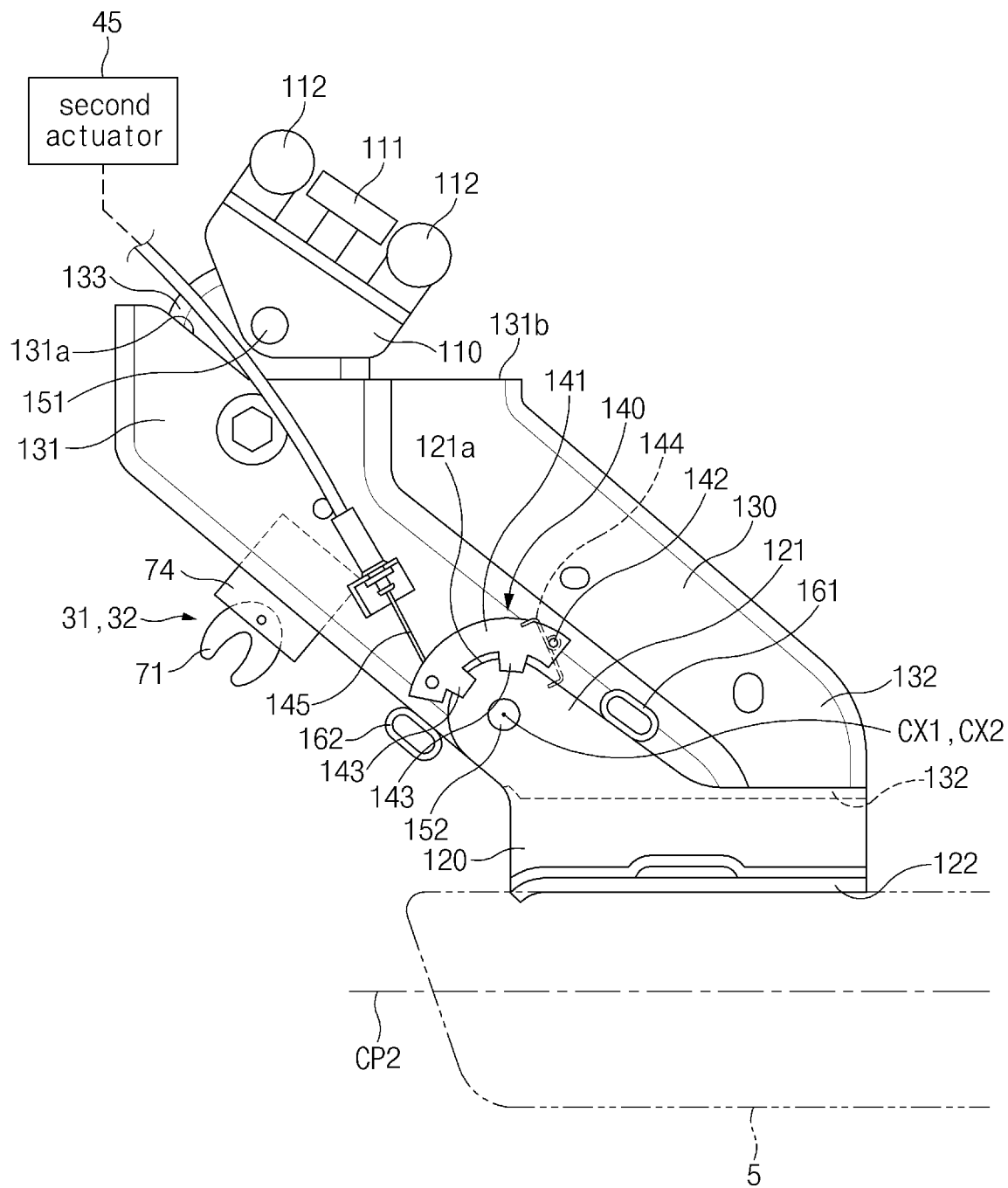
FIG. 6 illustrates an upper link mechanism and a lower link mechanism in a vehicle door opening and closing apparatus according to an exemplary embodiment of the present disclosure, in a state in which a rotation restricting unit restricts the rotation of a second mounting member.
Figure 7:
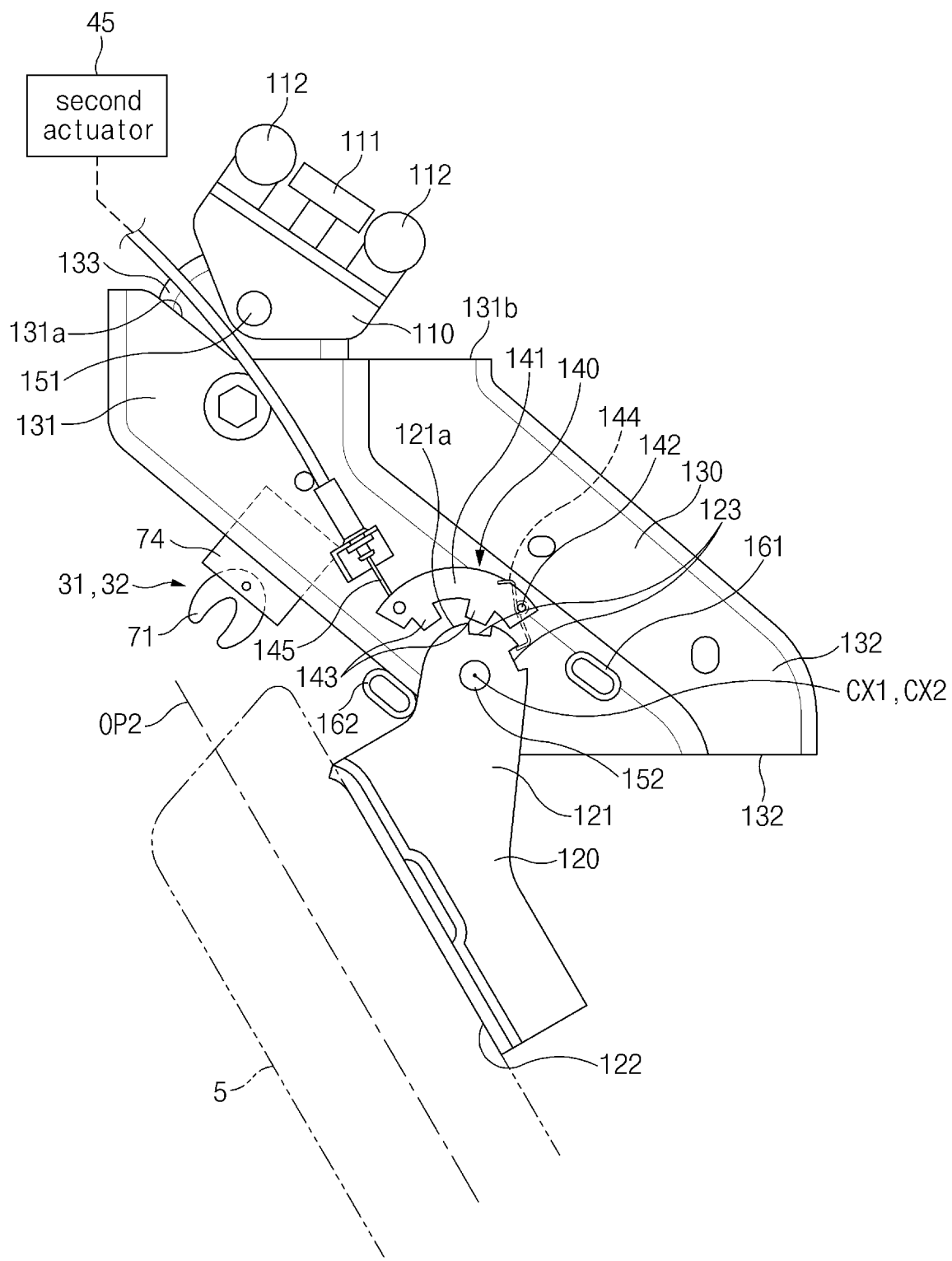
FIG. 7 illustrates an upper link mechanism and a lower link mechanism in a vehicle door opening and closing apparatus according to an exemplary embodiment of the present disclosure, in a state in which a rotation restricting unit allows the rotation of a second mounting member.

When the user presses or otherwise engages the second switch 42 and the swing mode is selected, the vehicle door 5 may swing as illustrated in FIG. 4 as the user pushes or pulls the outside handle 6 toward a passenger compartment of the vehicle or toward the exterior side of the vehicle. In the swing mode, the vehicle door 5 may move between a second open position OP2 in which the vehicle door 5 is fully opened and a second closed position CP2 in which the vehicle door 5 is fully closed, as illustrated in FIGS. 6 and 7. In particular, when the vehicle door 5 is held in the first closed position CP1, it may be operated in the swing mode.

The upper link mechanism 21 may have an upper hold lock 31, and the vehicle body 1 may have a first upper striker 31a and a second upper striker 31b that protrudes downwardly from a roof the vehicle body 1. The first upper striker 31a may be aligned with or adjacent to a virtual axis of the first closed position CP1, and the second upper striker 31b may be aligned with or adjacent to a virtual axis of the first open position OP1.

According to an exemplary embodiment, as illustrated in FIGS. 1 and 3, the upper hold lock 31 may releasably hold the first upper striker 31a in the first closed position CP1, and releasably hold the second upper striker 31b in the first open position OP1. In other words, one upper hold lock 31 may selectively hold the first upper striker 31a and the second upper striker 31b. As the upper hold lock 31 holds the first upper striker 31a, the upper link mechanism 21 may be firmly held in the first closed position CP1, and thus, the vehicle door 5 may be maintained in the first closed position CP1. As the upper hold lock 31 holds the second upper striker 31b, the upper link mechanism 21 may be firmly held in the first open position OP1, and thus, the vehicle door 5 may be maintained in the first open position OP1.

According to another exemplary embodiment, the upper hold lock 31 may releasably hold the first upper striker 31a in the first closed position CP1 and thus, the vehicle door 5 may be maintained in the first closed position CP1. In other words, the upper hold lock 31 may be an upper closed hold lock which keeps the closed state of the vehicle door 5 in the first closed position CP1. An upper open hold lock (not shown) may be mounted on the upper link mechanism 21, and may releasably hold the second upper striker 31b in the first open position OP1. In other words, the upper closed hold lock 31, which releasably holds the first upper striker 31a in the first closed position CP1, and the upper open hold lock (not shown), which releasably holds the second upper striker 31b in the first open position OP1, may be individually mounted on the upper link mechanism 21.

Referring to FIGS. 4 and 6, the upper link mechanism 21 may have an upper rotation axis CX1, and the vehicle door 5 may rotate around the upper rotation axis CX1. When the upper link mechanism 21 is firmly held in the first closed position CP1 by the upper hold lock 31 and the first upper striker 31a, the vehicle door 5 may be configured to rotate around the upper rotation axis CX1.

The lower link mechanism 22 may include a lower hold lock 32, and the vehicle body 1 may have a first lower striker 32a and a second lower striker 32b that protrude upwardly from the bottom of the vehicle body 1. The first lower striker 32a may be aligned with or adjacent to the virtual axis of the first closed position CP1, and the second lower striker 32b may be aligned with or adjacent to the virtual axis of the first open position OP1.

According to an exemplary embodiment, as illustrated in FIGS. 1 and 3, the lower hold lock 32 may releasably hold the first lower striker 32a in the first closed position CP1, and releasably hold the second lower striker 32b in the first open position OP1. In other words, one lower hold lock 32 may selectively hold the first lower striker 32a and the second lower striker 32b. As the lower hold lock 32 holds the first lower striker 32a, the lower link mechanism 22 may be firmly held in the first closed position CP1, and thus, the vehicle door 5 may be maintained in the first closed position CP1. As the lower hold lock 32 holds the second lower striker 32b, the lower link mechanism 22 may be firmly held in the first open position OP1, and thus, the vehicle door 5 may be maintained in the first open position OP1.

According to another exemplary embodiment, the lower hold lock 32 may releasably hold the first lower striker 32a in the first closed position CP1 and thus, the vehicle door 5 may be maintained in the first closed position CP1. In other words, the lower hold lock 32 may be a lower closed hold lock which maintains the closed state of the vehicle door 5 in the first closed position CP1. A lower open hold lock (not shown) may be mounted on the lower link mechanism 22, and may releasably hold the second lower striker 32b in the first open position OP1. In other words, the lower closed hold lock 32, which releasably holds the first lower striker 32a in the first closed position CP1, and the lower open hold lock (not shown), which releasably holds the second lower striker 32b in the first open position OP1, may be individually mounted on the lower link mechanism 22.

According to an exemplar)/embodiment, the vehicle door 5 may be releasably held in the first closed position CP1 by the upper hold lock 31 and the lower hold lock 32, and thus, the vehicle door 5 may be maintained in the first closed position CP1 by the upper hold lock 31 and the lower hold lock 32. In other words, the upper hold lock 31 and the lower hold lock 32 may operate as the closed hold lock which maintains the vehicle door 5 in the first closed position CP1.

Referring to FIG. 4, the lower link mechanism 22 may have a lower rotation axis CX2, and the vehicle door 5 may be configured to rotate around the lower rotation axis CX2. When the lower link mechanism 22 is firmly held in the first closed position CP1 by the lower hold lock 32 and the first lower striker 32a, the vehicle door 5 may be configured to rotate around the lower rotation axis CX2. As illustrated in FIG. 4, the upper rotation axis CX1 and the lower rotation axis CX2 may be vertically aligned, and the vehicle door 5 may be configured to rotate around the vertically aligned upper and lower rotation axes CX1 and CX2.

Referring to FIG. 2, the selector 40 may be electrically connected to a first actuator 43 and a second actuator 45. The first actuator 43 may be configured to operate the upper hold lock 31 and the lower hold lock 32, and the second actuator 45 may be configured to operate rotation restricting units 140 and 170 to be described below. As the user selects the selector 40, the first actuator 43 may be configured to selectively perform a first hold operation in which the upper hold lock 31 holds the first upper striker 31 and the lower hold lock 32 holds the first lower striker 32a, and a first release operation in which the upper hold lock 31 releases the first upper striker 31 and the lower hold lock 32 releases the first lower striker 32a.

When the user presses or otherwise engages the first switch 41 of the selector 40 when the vehicle door 5 is closed, the upper hold lock 31 may be configured to release the first upper striker 31a and the lower hold lock 32 may be configured to release the first lower striker 32a simultaneously by the first release operation of the first actuator 43. Thus, the user may slide the vehicle door 5 in the longitudinal direction of the vehicle body 1 to open the vehicle door 5 and close in the sliding mode.

When the user presses or otherwise engages the second switch 42 of the selector 40 when the vehicle door 5 is closed, the upper hold lock 31 may hold the first upper striker 31a and the lower hold lock 32 may hold the first lower striker 32a simultaneously by the first hold operation of the first actuator 43, and the upper link mechanism 21 and the lower link mechanism 22 may be firmly held in the first closed position CP1. Thus, the user may swing the vehicle door 5 toward an interior space and an exterior space of the vehicle to open the vehicle door 5 and close in the swing mode.

According to an exemplary embodiment, as illustrated in FIG. 2, one actuator 43 may be configured to operate the upper hold lock 31 and the lower hold lock 32 simultaneously. According to another exemplary embodiment, a first actuator may be configured to operate the upper hold lock 31 and a second actuator may be configured to the lower hold lock 32 and may be individually connected to the selector 40.

FIGS. 10A to 10D illustrate the upper hold lock 31 and the lower hold lock 32 according to an exemplary embodiment of the present disclosure. Referring to FIGS. 10A to 10D, each of the upper hold lock 31 and the lower hold lock 32 may include a catch 71, a pawl 72 releasably engaging with the catch 71, and a lever 73 operatively connected to the pawl 72. The lever 73 may be connected to the first actuator 43 via a first cable 75. As the first cable 75 is reversed (pulled) by the first actuator 43, the catch 71 may be configured to release the strikers 31a and 32a. A portion of the catch 71, the pawl 72, and the lever 73 may be covered by a cover plate 76, and the cover plate 76 may be attached to a mounting plate 74. The strikers 31a and 32a may be fixed to the vehicle body 1 by a mounting plate 78.

Figure 10A:
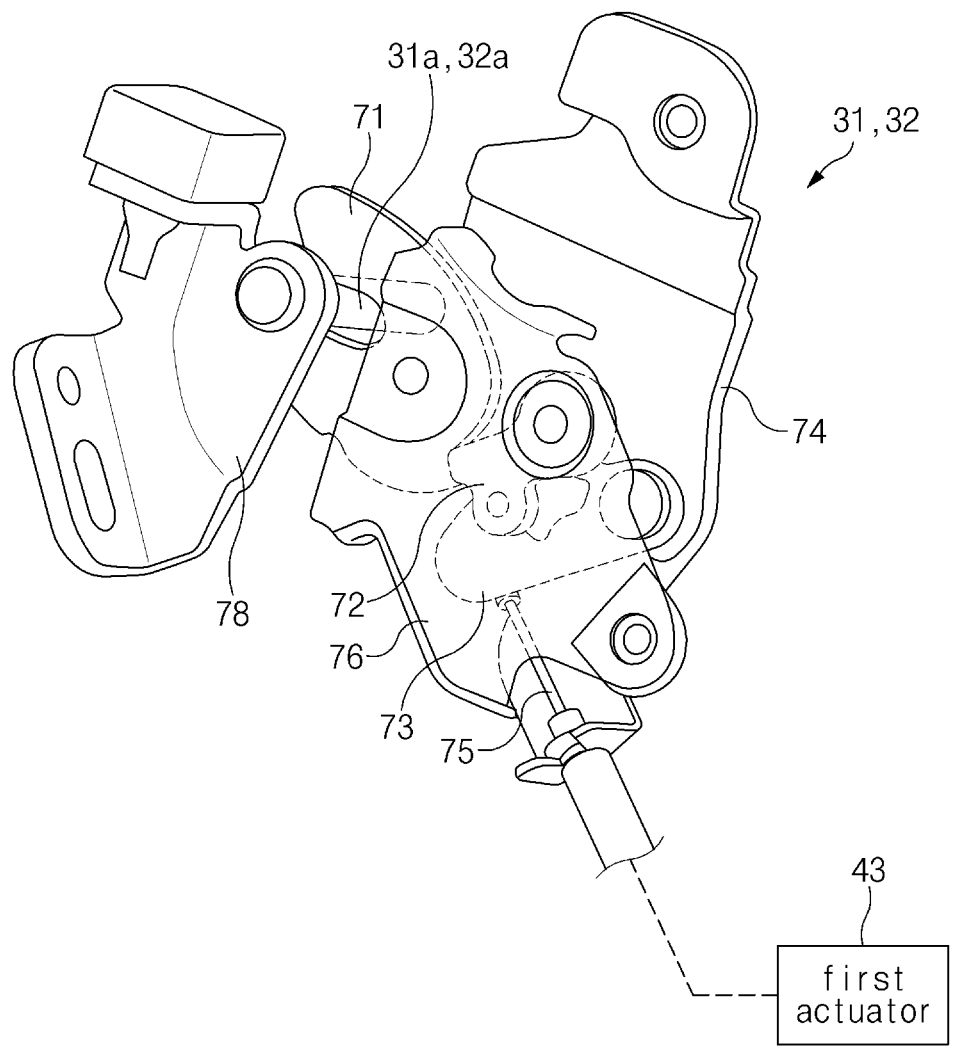
FIG. 10A illustrates a perspective view of an upper hold lock and a lower hold lock according to an exemplar)/embodiment of the present disclosure.
Figure 10B:
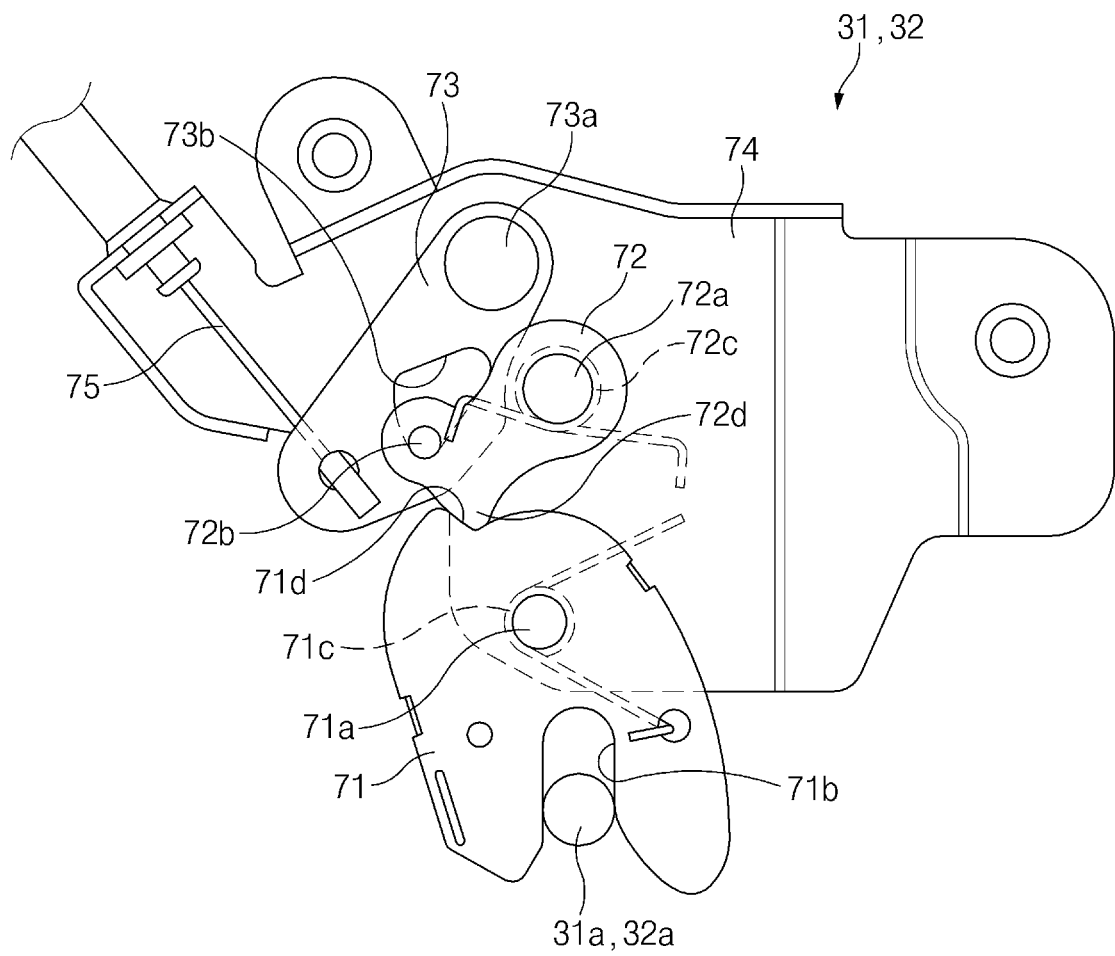
FIG. 10B illustrates a state in which an upper hold lock and a lower hold lock hold corresponding strikers according to an exemplar)/embodiment of the present disclosure.
Figure 10C:
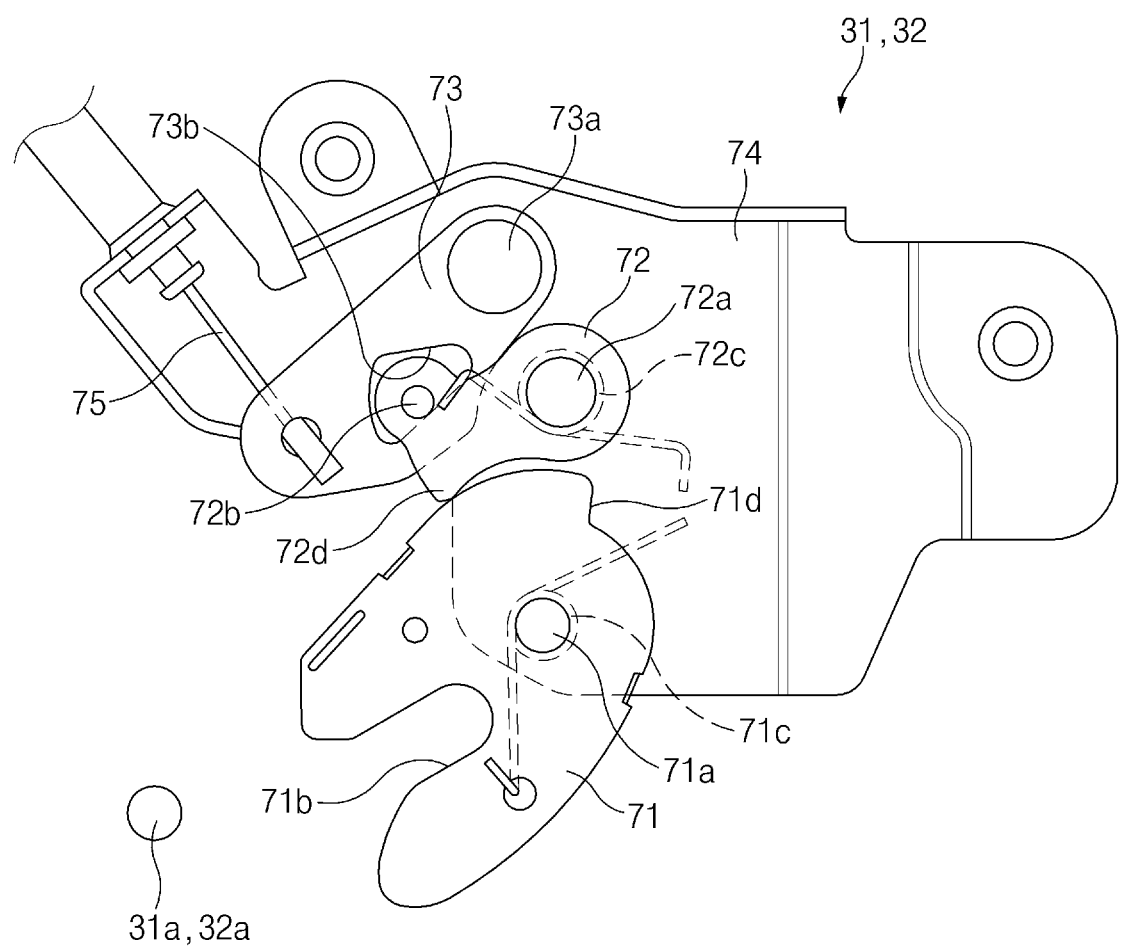
FIG. 10C illustrates a state in which an upper hold lock and a lower hold lock release corresponding strikers according to an exemplar)/embodiment of the present disclosure.

Referring to FIGS. 10A to 10D, the upper hold lock 31 may releasably hold the first upper striker 31a, and the lower hold lock 32 may releasably hold the first lower striker 32a. The catch 71 may be pivotally mounted on the mounting plate 74 via a first pivot shaft 71a The catch 71 may have a slot 71b that receives the strikers 31a and 32a, and the catch 71 may engage and release the strikers 31a and 32a. The catch 71 may move between an engaging position (see FIG. 10B) and a release position (see FIG. 10C). The engaging position refers to a position in which the catch 71 engages with the strikers 31a and 32a as illustrated in FIG. 10B, and the release position refers to a position in which the catch 71 releases the strikers 31a and 32a as illustrated in FIG. 10C.

When the catch 71 is in the engaging position as illustrated in FIG. 10B, the catch 71 may be configured to engage with the strikers 31a and 32a and thus, the catch 71 may hold the strikers 31a and 32a. When the catch 71 is in the release position as illustrated in FIG. 10C, the catch 71 may be configured to release the strikers 31a and 32a Thus, the strikers 31a and 32a may be released from the slot 71b of the catch 71 or be received in the slot 71b of the catch 71. The catch 71 may be biased toward the release position by a first biasing element 71c such as a torsion spring. The first biasing element 71c may be disposed around the first pivot shaft 71a. The catch 71 may have a locking shoulder 71d.

Figure 10D:
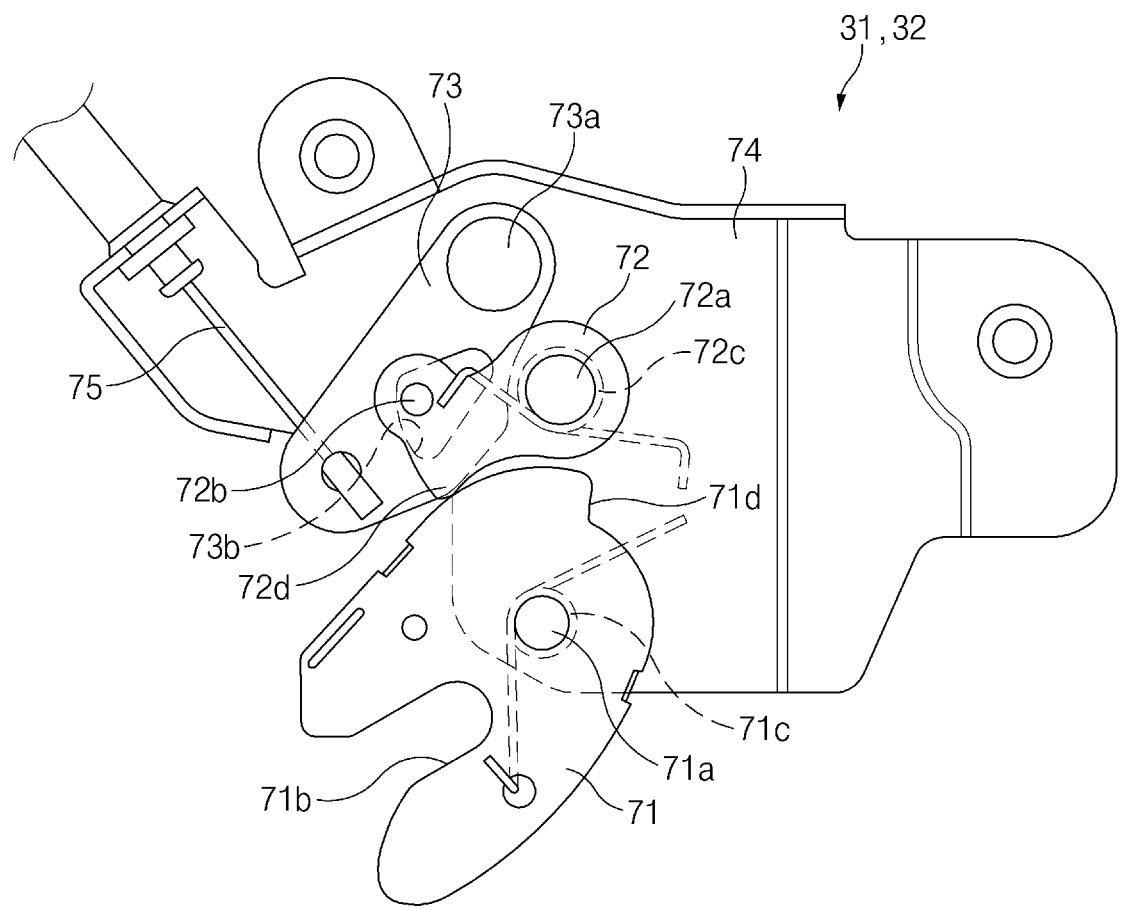
FIG. 10D illustrates a state in which an upper hold lock and a lower hold lock are enabled to receive corresponding strikers according to an exemplary embodiment of the present disclosure.

The pawl 72 may be pivotally mounted on the mounting plate 74 via a second pivot shaft 72a, and the pawl 72 may be configured to move between a pawl locking position (see FIG. 10B) and a pawl release position (see FIGS. 10C and 10D). The pawl locking position refers to a position in which the pawl 72 engages with the catch 71 and the catch 71 is maintained in the engaging position, and the pawl release position refers to a position in which the pawl 72 releases the catch 71 and the catch 71 is allowed to move from the engaging position to the release position.

As illustrated in FIG. 10B, when the pawl 72 is in the pawl locking position, the movement (rotation) of the catch 71 may be restricted by the pawl 72 to maintain the catch 71 in the engaging position. As illustrated in FIGS. 10C and 10D, when the pawl 72 is in the pawl release position, the movement (rotation) of the catch 71 may not be restricted by the pawl 72 and thus, the catch 71 may move from the engaging position to the release position. The pawl 72 may be biased toward the pawl locking position (see FIG. 10B) by a second biasing element 72c such as a torsion spring. The second biasing element 72c may be disposed around the second pivot shaft 72a.

The pawl 72 may include a locking projection 72d locked to the locking shoulder 71d of the catch 71. As illustrated in FIG. 10B, as the pawl 72 is moved to the pawl locking position by the second biasing element 72c, the locking projection 72d of the pawl 72 may be locked to the locking shoulder 71d of the catch 71 and the movement (rotation) of the catch 71 may be restricted, and thus, the catch 71 may be maintained in the engaging position. As illustrated in FIG. 10C, as the pawl 72 is moved to the pawl release position by the lever 73, the locking projection 72d of the pawl 72 may be released from the locking shoulder 71d of the catch 71 and the movement (rotation) of the catch 71 may be allowed, and thus, the catch 71 may be moved to the release position by the first biasing element 71c.

The lever 73 may be pivotally mounted on the mounting plate 74 through a third pivot shaft 73a. The lever 73 may be connected to the first actuator 43 through the first cable 75. An end of the first cable 75 may be fixed to the lever 73, and the first cable 75 may be advanced or reversed by the first actuator 43. As the first actuator 43 moves the first cable 75, the lever 73 may pivot around the third pivot shaft 73a. The lever 73 may move the pawl 72 to the pawl release position (see FIG. 10C) by reversing the first cable 75. The lever 73 may be operatively connected to the pawl 72 via a pin 72b and an opening 73b. The pin 72b may be provided on the pawl 72, and the opening 73b may be provided in the lever 73. The pin 72b may be movably received in the opening 73b. As the lever 73 pivots around the third pivot shaft 73a, the pin 72b may move in the opening 73b, allowing the pawl 72 to move.

As illustrated in FIG. 10B, when the first cable 75 is advanced by the first actuator 43, the locking projection 72d of the pawl 72 may be locked to the locking shoulder 71d of the catch 71 and the movement (rotation) of the catch 71 may be restricted to maintain the catch 71 in the engaging position. The strikers 31a and 32a may be held in the slot 71b of the catch 71. In other words, the upper hold lock 31 and the lower hold lock 32 may hold the corresponding strikers 31a and 32a.

As illustrated in FIG. 10C, when the first cable 75 is reversed by the first actuator 43, the lever 73 may be configured to move the pawl 72 to the pawl release position. The locking projection 72d of the pawl 72 may be released from the locking shoulder 71d of the catch 71 and the movement (rotation) of the catch 71 may be allowed, and thus, the catch 71 may be moved to the release position by the first biasing element 71c, and the strikers 31a and 32a may be released from the slot 71b of the catch 71. Thus, the upper hold lock 31 and the lower hold lock 32 may be configured to release the corresponding strikers 31a and 32a, and the upper link mechanism 21 and the lower link mechanism 22 may slide along the upper rail 11 and the lower rail 12.

As illustrated in FIG. 10D, even though the first cable 75 is advanced by the first actuator 43 when the locking projection 72d of the pawl 72 is released from the locking shoulder 71d of the catch 71, the catch 71 may be maintained in the release position by the first biasing element 71c to allow the movement (rotation) of the catch 71. In this state, the strikers 31a and 32a may be allowed to be received in the slot 71b of the catch 71. In other words, in a state in which the movement (rotation) of the catch 71 is allowed as the locking projection 72d of the pawl 72 is released from the locking shoulder 71d of the catch 71, when the upper link mechanism 21 and the lower link mechanism 22 slide between the first closed position CP1 and the first open position OP1, the strikers 31a and 32a may be allowed to be received in the slot 71b of the catch 71.

When a force applied by the upper hold lock 31 and the lower hold lock 32 in a state in which the strikers 31a and 32a are received in the slot 71b of the catch 71 is greater than a spring force of the first biasing element 71c, the catch 71 may be moved to the engaging position. As illustrated in FIG. 10B, as the locking projection 72d of the pawl 72 is locked to the locking shoulder 71d of the catch 71, the catch 71 may hold the strikers 31a and 32a.

Figure 5:
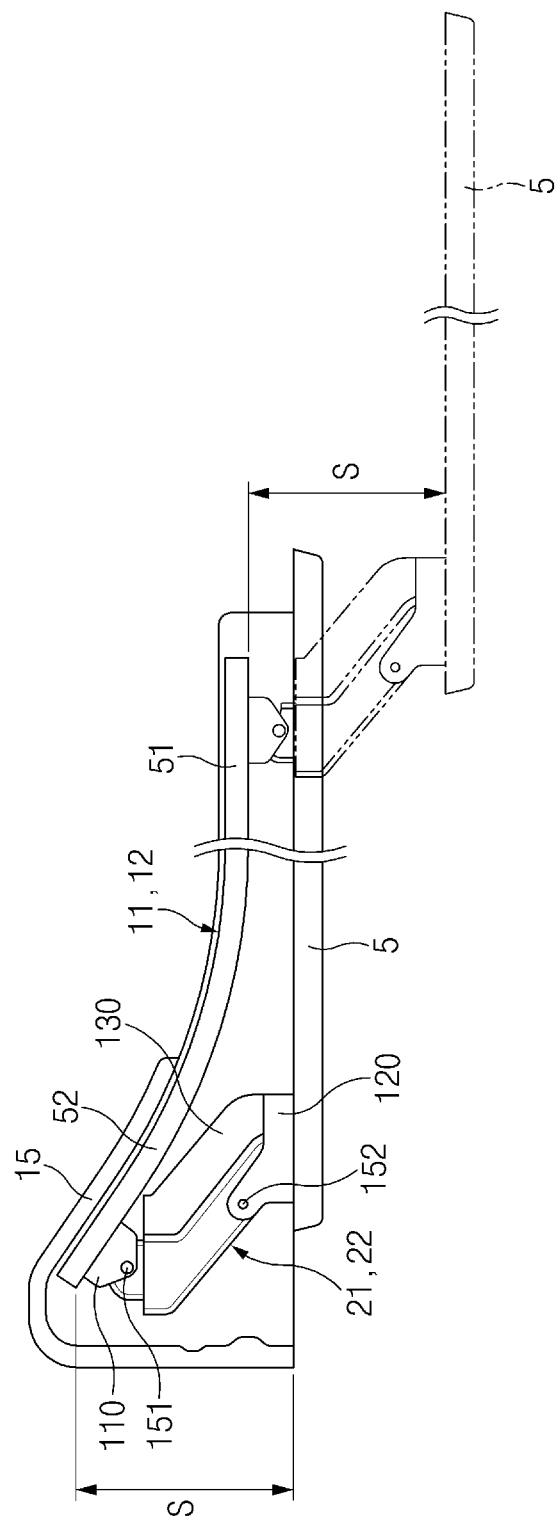
FIG. 5 illustrates sliding mode in which an upper link mechanism and a lower link mechanism move along an upper rail and a lower rail in a vehicle door opening and closing apparatus according to an exemplary embodiment of the present disclosure.

Referring to FIG. 5, each of the upper rail 11 and the lower rail 12 may be mounted on the vehicle body 1 through a mounting bracket 15, and the mounting bracket 15 may have a shape that corresponds to that of the upper rail 11 and the lower rail 12. Each of the upper rail 11 and the lower rail 12 may have a first extension portion 51 that extends straightly in the longitudinal direction of the vehicle, and a second extension portion 52 that extends from the first extension portion 51 toward the interior space of the vehicle. The second extension portion 52 may be bent with respect to the first extension portion 51 at a predetermined angle.

Referring to FIG. 6, each of the upper link mechanism 21 and the lower link mechanism 22 may include a first mounting member 110 mounted on the vehicle body 1, a second mounting member 120 mounted on the vehicle door 5, and a body 130 connected to the first mounting member 110 and the second mounting member 120. The first mounting member 110 may be rotatably connected to the body 130 via a first shaft 151. The first mounting member 110 may be movably mounted on the rails 11 and 12 of the vehicle body 1 through rollers 111 and 112. The rollers 111 and 112 may be rotatably on the first mounting member 110, and roll along the rails 11 and 12. As illustrated in FIG. 6, a middle roller 111 and two side rollers 112 disposed on both sides of the middle roller 111 may be rotatably mounted on the first mounting member 110. A rotation axis of the middle roller 111 may be perpendicular to a rotation axis of the side roller 112.

The second mounting member 120 may include a first end portion 121 facing the body 130, and a second end portion 122 fixed to the vehicle door 5. The first end portion 121 may be rotatably connected to the body 130 through a second shaft 152. The first end portion 121 may have a curved surface 121a such as a semicircular surface, and a plurality of recesses 123 may be formed along the curved surface 121a of the first end portion 121. The second end portion 122 may be fixed to the vehicle door 5 using fasteners, welding, and/or the like.

The body 130 may extend diagonally to prevent contact with the first extension portion 51 and the second extension portion 52. The body 130 may have a first end portion 131 facing the interior side of the vehicle, and a second end portion 132 facing the exterior side of the vehicle. The body 130 may have a pivot lug 133 that protrudes from the first end portion 131 toward the first mounting member 110, and the pivot lug 133 may be connected to the first mounting member 110 through the first shaft 151, to rotate (pivot) the first mounting member 110 around the first shaft 151. The first end portion 131 may include a first restricting surface 131a and a second restricting surface 131b which restrict the range of rotation of the first mounting member 110, and the first restricting surface 131a and the second restricting surface 131b may intersect at a predetermined angle. The second mounting member 120 may be rotatably connected to the second end portion 132 of the body 130 through the second shaft 152, to rotate (pivot) the second mounting member 120 around the second shaft 152.

The upper hold lock 31 may be mounted on the body 130 of the upper link mechanism 21, and the lower hold lock 32 may be mounted on the body 130 of the lower link mechanism 22. When, by the first hold operation of the first actuator 43, the upper hold lock 31 firmly holds the body 130 of the upper link mechanism 21 in the first closed position CP1 and the lower hold lock 32 firmly holds the body 130 of the lower link mechanism 22 in the first closed position CP1, the vehicle door 5 may swing around the upper rotation axis CX1 of the upper link mechanism 21 and the lower rotation axis CX2 of the lower link mechanism 22. As illustrated in FIGS. 6 and 7, the vehicle door 5 may move between the second closed position CP2 in which the vehicle door 5 is closed and the second open position OP2 in which the vehicle door 5 is opened.

According to an exemplary embodiment, each of the upper link mechanism 21 and the lower link mechanism 22 may include a rotation restricting unit 140 configured to selectively restrict the rotation of the second mounting member 120. According to the exemplary embodiment illustrated in FIGS. 6 to 8, the rotation restricting unit 140 may include a restricting element 141 releasably holding the first end portion 121 of the second mounting member 120. The restricting element 141 may be pivotally mounted on the body 130, and the first end portion 121 of the second mounting member 120 may be releasably held by the pivoting of the restricting element 141.

The restricting element 141 may have a curved shape that corresponds to the curved surface 121a of the first end portion 121 of the second mounting member 120. The restricting element 141 may include a plurality of projections 143 releasably fitted into the recesses 123 of the second mounting member 120. As the projections 143 of the restricting element 141 are fitted into the recesses 123 of the second mounting member 120, the restricting element 141 may firmly engage with the first end portion 121 of the second mounting member 120, and as the projections 143 of the restricting element 141 are released from the recesses 123 of the second mounting member 120, the restricting element 141 may release the first end portion 121 of the second mounting member 120.

The restricting element 141 may be pivotally mounted adjacent to the second end portion 132 of the body 130 through a pivot pin 142, to move the restricting element 141 between an engaging position (see FIG. 6) and a release position (see FIG. 7). The engaging position refers to a position in which the restricting element 141 engages with the first end portion 121 of the second mounting member 120 as illustrated in FIG. 6 to restrict the rotation of the second mounting member 120. The release position refers to a position in which the restricting element 141 releases the first end portion 121 of the second mounting member 120 as illustrated in FIG. 7 to allow the rotation of the second mounting member 120.

The restricting element 141 may be biased toward the engaging position by a torsional biasing element 144 such as a torsion spring. The biasing element 144 may be disposed around the pivot pin 142. The restricting element 141 may be connected to the second actuator 45 via a second cable 145, and an end of the second cable 145 may be fixed to the restricting element 141. The second cable 145 may be advanced or reversed by the second actuator 45.

As the user selects the selector 40, the second actuator 45 may be configured to selectively perform a second hold operation in which the restricting element 141 holds the first end portion 121 of the second mounting member 120, and a second release operation in which the restricting element 141 releases the first end portion 121 of the second mounting member 120. When the second cable 145 is advanced by the second actuator 45 through the second hold operation, the restricting element 141 may engage with the first end portion 121 of the second mounting member 120 as illustrated in FIG. 6 to hold the second mounting member 120, to restrict the rotation of the second mounting member 120 to thus maintain the vehicle door 5 in the second closed position CP2. When the second cable 145 is reversed by the second actuator 45 through the second release operation, the restricting element 141 may release the first end portion 121 of the second mounting member 120 as illustrated in FIG. 7 to allow the second mounting member 120 to rotate around the second shaft 152, to thus allow the vehicle door 5 to move (swing) between the second closed position CP2 and the second open position OP2.

Figure 8:
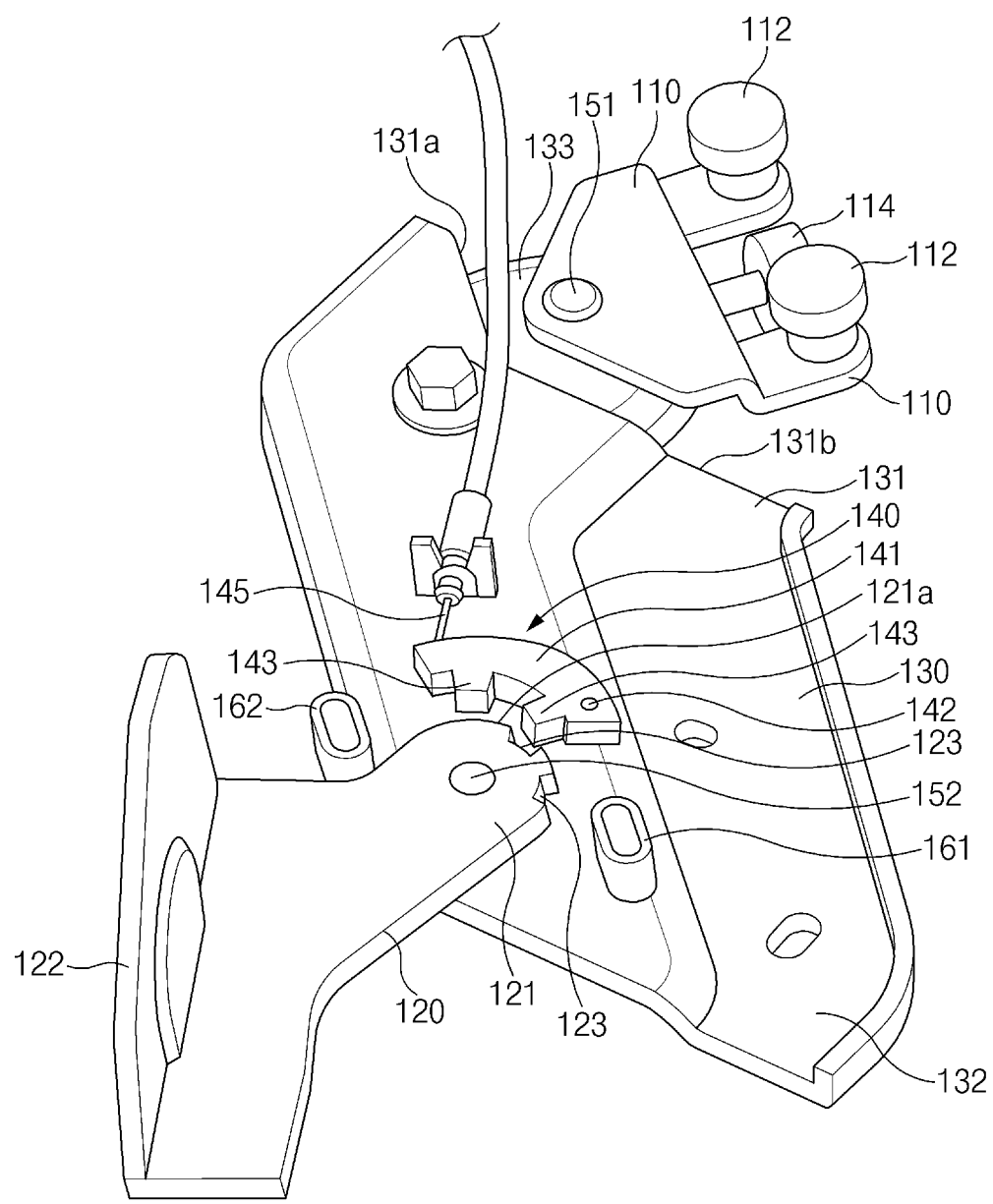
FIG. 8 illustrates a perspective view of an upper link mechanism and a lower link mechanism in a vehicle door opening and closing apparatus according to an exemplary embodiment of the present disclosure.

According to the exemplar)/embodiment illustrated in FIGS. 6 to 8, the upper rotation axis CX1 and the lower rotation axis CX2 may be defined by the second shaft 152. For example, the upper rotation axis CX1 and the lower rotation axis CX2 may be a virtual axis that extends vertically along a center point of the second shaft 152, and the upper rotation axis CX1 and the lower rotation axis CX2 may be vertically aligned, to allow the vehicle door 5 to swing around the vertical rotation axis that virtually connects the upper rotation axis CX1 and the lower rotation axis CX2.

When the user presses or otherwise engages the first switch 41 of the selector 40 when the vehicle door 5 is closed, the first release operation of the first actuator 43 and the second hold operation of the second actuator 45 may be performed simultaneously. As the user slides the vehicle door 5 in the longitudinal direction of the vehicle body 1, the vehicle door 5 may be opened and closed in the sliding mode as illustrated in FIG. 5. The upper hold lock 31 may release the first upper striker 31a and the lower hold lock 32 may release the first lower striker 32a simultaneously by the first release operation of the first actuator 43, and the rotation of the second mounting member 120 may be restricted by the second hold operation of the second actuator 45.

As the rollers 111 and 112 of the first mounting member 110 roll along the rails 11 and 12, the vehicle door 5 may slide along the sliding path defined by the rails 11 and 12. In other words, the sliding path may be selected as the movement path of the vehicle door, to open and close the vehicle door in the sliding mode. As illustrated in FIG. 5, when the rollers 111 and 112 of the first mounting member 110 roll along the second extension portion 52 of the rails 11 and 12, the first mounting member 110 may rotate around the first shaft 151 to correspond to the curvature of the second extension portion 52 of the rails 11 and 12. When the vehicle door 5 is opened and closed in the sliding mode, the rotation of the first mounting member 110 may be allowed, and the rotation of the second mounting member 120 may be restricted.

Referring to FIG. 5, when the vehicle door 5 is opened and closed in the sliding mode, the rotation of the second mounting member 120 may be restricted and thus, a gap S between the vehicle body 1 and the vehicle door 5 may correspond to a length of the body 130. When the vehicle door 5 moves between the first open position OP1 and the first closed position CP1, the gap S between the vehicle body 1 and the vehicle door 5 may be maintained constant. Thus, the vehicle door 5 may be prevented from interfering with the vehicle body 1 when the vehicle door 5 slides.

When the user presses or otherwise engages the second switch 42 of the selector 40 in a state in which the vehicle door 5 is opened, the first hold operation of the first actuator 43 and the second release operation of the second actuator 45 may be performed simultaneously. As the user swings the vehicle door 5, the vehicle door 5 may be opened and closed in the swing mode as illustrated in FIGS. 6 and 7. The upper hold lock 31 may hold the first upper striker 31a and the lower hold lock 32 may hold the first lower striker 32a simultaneously by the first hold operation of the first actuator 43, and the rotation of the second mounting member 120 may be allowed by the second release operation of the second actuator 45.

As the body 130 of the upper link mechanism 21 and the body 130 of the lower link mechanism 22 are held in the first closed position CP1, the movement of the first mounting member 110 may not be allowed, and as the second mounting member 120 rotates around the second shaft 152, the vehicle door 5 may swing along the swing path defined by the rotation of the second mounting member 120. In other words, the swing path may be selected as the movement path of the vehicle door, and thus, the vehicle door may be opened and closed in the swing mode.

In addition, the body 130 may include a first damper 161 and a second damper 162 that restrict the range of rotation of the second mounting member 120. The first damper 161 and the second damper 162 may be a shock absorbing material such as rubber. The first damper 161 and the second damper 162 may be spaced apart from each other to restrict the range of rotation of the second mounting member 120, and the first damper 161 and the second damper 162 may be disposed adjacent to the second end portion 132 of the body 130.

The first damper 161 may be positioned to come into contact with the second mounting member 120 when the vehicle door 5 moves to the second closed position CP2 (e.g., when the vehicle door 5 is closed in the swing mode). For example, the first damper 161 may be fixed to the middle of a portion of the body 130 adjacent to the second end portion 132. As illustrated in FIG. 6, when the vehicle door 5 moves to the second closed position CP2, the second mounting member 120 may come into contact with the first damper 161, thereby appropriately restricting a position in which the vehicle door 5 is closed in the swing mode, in addition to damping shocks.

The second damper 162 may be positioned to come into contact with the second mounting member 120 when the vehicle door 5 moves to the second open position OP2 (e.g., when the vehicle door 5 is opened in the swing mode). For example, the second damper 162 may be fixed to a side surface of the second end portion 132 of the body 130. As illustrated in FIG. 7, when the vehicle door 5 moves to the second open position OP2, the second mounting member 120 may come into contact with the second damper 162, thereby appropriately restricting a position in which the vehicle door 5 is opened in the swing mode, in addition to damping shocks.

Figure 9:
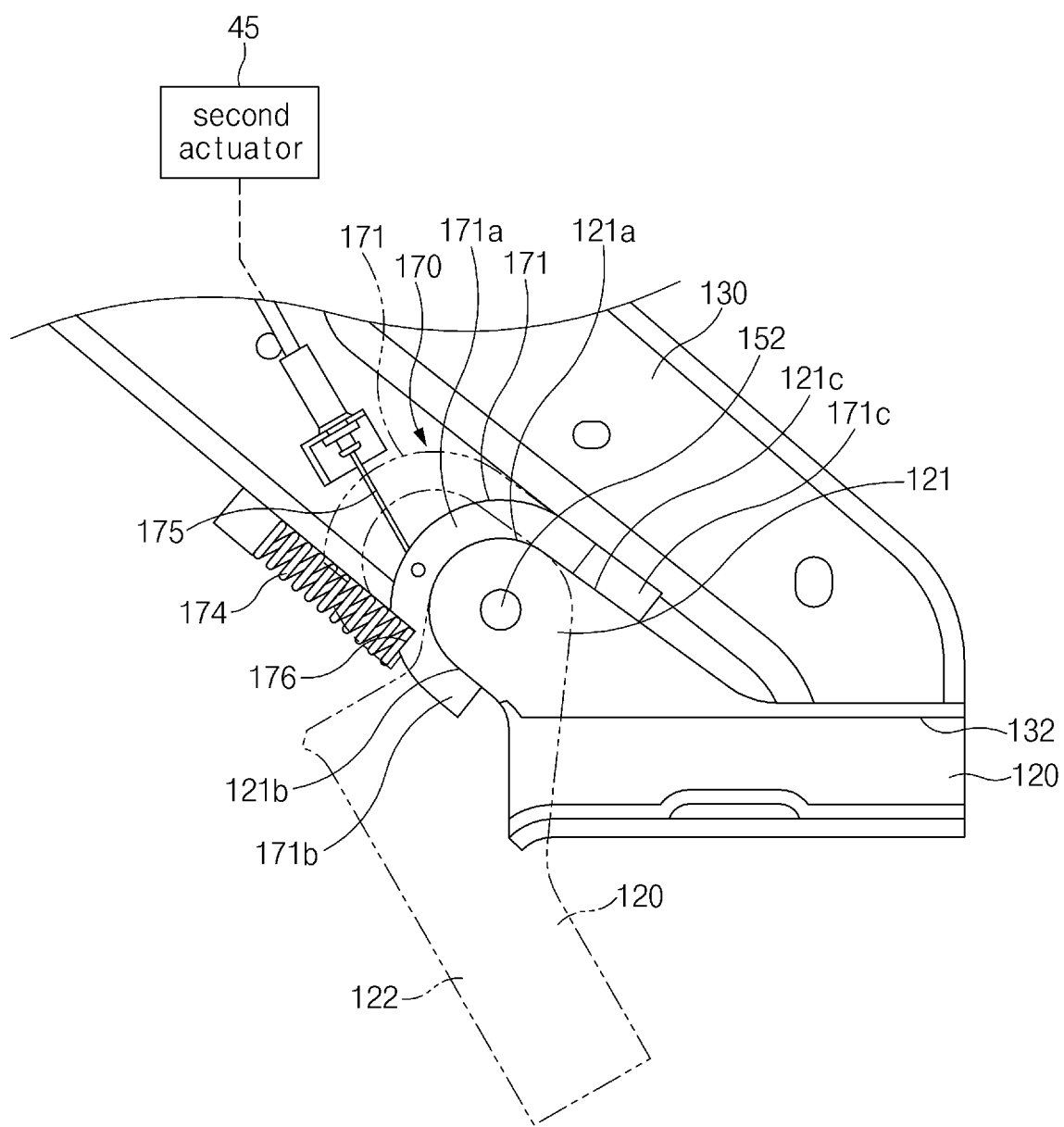
FIG. 9 illustrates an upper link mechanism and a lower link mechanism in a vehicle door opening and closing apparatus according to another exemplary embodiment of the present disclosure.

According to another exemplary embodiment illustrated in FIG. 9, the rotation restricting unit 170 may be configured to selectively restrict the rotation of the second mounting member 120. The rotation restricting unit 170 may include a restricting element 171 releasably holding the first end portion 121 of the second mounting member 120. The restricting element 171 may be slidably mounted on the body 130, and thus, the first end portion 121 of the second mounting member 120 may be releasably held by the sliding of the restricting element 171.

The first end portion 121 of the second mounting member 120 may have a pair of engaging surfaces 121b and 121c that extend straight from both sides of the curved surface 121a. The restricting element 171 may include a curved portion 171a that corresponds to the curved surface 121a of the first end portion 121 of the second mounting member 120, and a pair of extension portions 171b and 171c that extend from both ends of the curved portion 171a.

The restricting element 171 may be configured to engage and release the first end portion 121 of the second mounting member 120. The restricting element 171 may move (slide) between an engaging position (see a solid line in FIG. 9) and a release position (see a two-dot chain line in FIG. 9). The engaging position refers to a position in which the restricting element 171 engages with the first end portion 121 of the second mounting member 120 to restrict the rotation of the second mounting member 120 as indicated by the solid line in FIG. 9. The release position refers to a position in which the restricting element 171 releases the first end portion 121 of the second mounting member 120 to allow the rotation of the second mounting member 120 as indicated by the two-dot chain line in FIG. 9.

When the restricting element 171 moves to the engaging position (see the solid line in FIG. 9), the curved portion 171a of the restricting element 171 may tightly contact (e.g., abutting contact) the curved surface 121a of the second mounting member 120, and the extension portions 171b and 171c of the restricting element 171 may tightly contact (e.g., abutting contact) the engaging surfaces 121b and 121c of the second mounting member 120, respectively, to allow the restricting element 171 to engage with the first end portion 121 of the second mounting member 120.

When the restricting element 171 moves to the release position (see the two-dot chain line in FIG. 9), the curved portion 171a of the restricting element 171 may be spaced apart from the curved surface 121a of the second mounting member 120. As a first extension portion 171b of the restricting element 171 is spaced apart from a first engaging surface 121b of the second mounting member 120, and a second extension portion 171c of the restricting element 171 is spaced apart from a second engaging surface 121c of the second mounting member 120, the restricting element 171 may release the first end portion 121 of the second mounting member 120.

The restricting element 171 may be biased toward the engaging position by a longitudinal biasing element 174 such as a coil spring. The biasing element 174 may apply a spring force to any one of the extension portions 171b and 171c of the restricting element 171. For example, the biasing element 174 may be interposed between a retainer 178 mounted on the side surface of the body 130 and a retainer surface 176 of the extension portion 171b. As the biasing element 174 applies the spring force to the restricting element 171, the restricting element 171 may be biased toward the engaging position.

The restricting element 171 may be connected to the second actuator 45 via the second cable 145, and the end of the second cable 145 may be fixed to the restricting element 171. The second cable 145 may be advanced or reversed by the second actuator 45. When the second cable 145 is advanced by the second actuator 45, the restricting element 171 may advance toward the second mounting member 120 by the biasing element 174. As the restricting element 171 moves to the engaging position, the restricting element 171 may engage with the first end portion 121 of the second mounting member 120. When the second cable 145 is reversed by the second actuator 45, the restricting element 171 may overcome the spring force of the biasing element 174 and be reversed from the second mounting member 120. As the restricting element 171 moves to the release position, the restricting element 171 may release the first end portion 121 of the second mounting member 120.

As indicated by the two-dot chain line in FIG. 9, when the rotation of the second mounting member 120 is allowed as the restricting element 171 releases the first end portion 121 of the second mounting member 120, the range of rotation of the second mounting member 120 may be restricted by the pair of extension portions 171b and 171c. The restricting element 171 including the extension portions 171b and 171c may be a shock absorbing material such as rubber. When the vehicle door 5 is opened in the swing mode, a first extension portion 171b may come into contact with the second mounting member 120, to appropriately restrict a position in which the vehicle door 5 is opened in the swing mode, in addition to damping shocks. When the vehicle door 5 is closed in the swing mode, a second extension portion 171c may come into contact with the second mounting member 120, to appropriately restrict a position in which the vehicle door 5 is closed in the swing mode, in addition to damping shocks.

Figure 11:
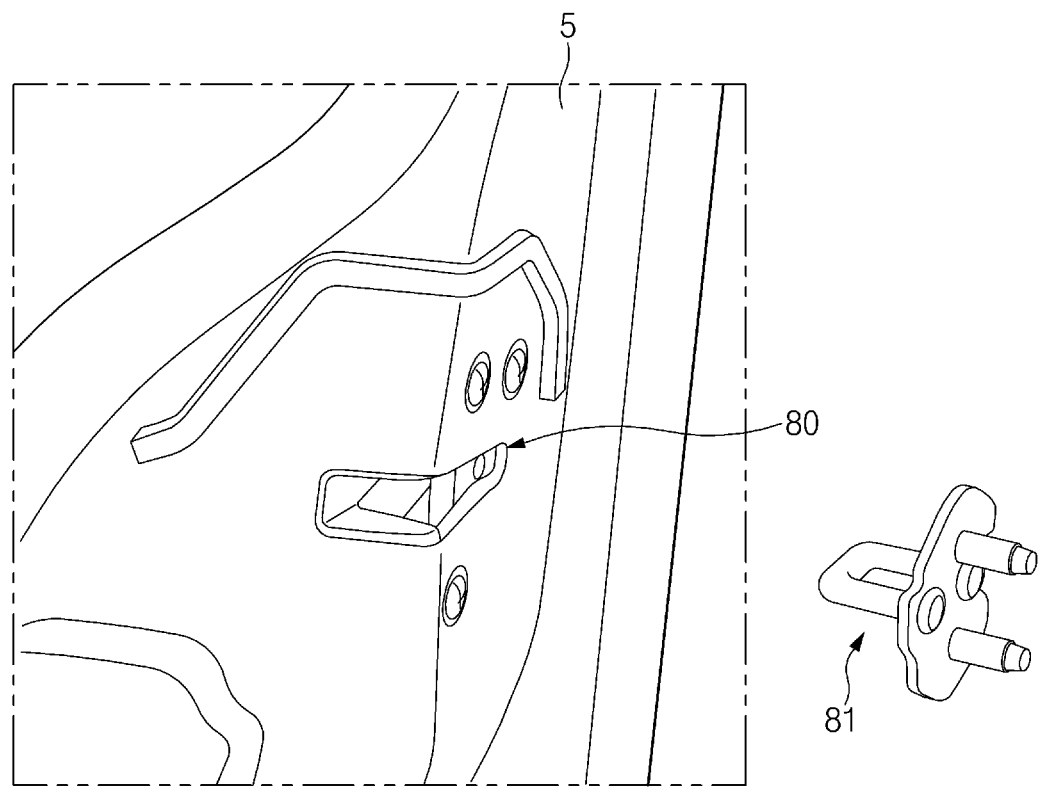
FIG. 11 illustrates a main latch mounted on a vehicle door and a main striker according to an exemplary embodiment of the present disclosure.

Since the other configurations and operations in this exemplary embodiment are similar to or the same as those in the exemplary embodiment illustrated in FIGS. 6 to 8, a detailed description thereof will be omitted. Referring to FIG. 11, a main latch 80 may be mounted on a rear end of the vehicle door 5, and a main striker 81 may be fixed to the vehicle body 1. The main latch 80 may releasably engage with the main striker 81. When the vehicle door 5 is in the first closed position CP1 or the second closed position CP2, the main latch 80 may engage with the main striker 81 by an engaging operation of the outside handle 6 to hold the vehicle door 5 in the first closed position CP1 or the second closed position CP2. When the vehicle door 5 is in the first closed position CP1 or the second closed position CP2, the main latch 80 may release the main striker 81 by a release operation of the outside handle 6 to allow the vehicle door 5 to move in the sliding mode or the swing mode. When the vehicle door 5 is held in the first closed position CP1 and the main latch 80 releases the main striker 81, a center roller unit 23 may be released from the center rail 13, to open and close the vehicle door 5 in the swing mode.

The vehicle door opening and closing apparatus, according to exemplary embodiments of the present disclosure, may further include the center rail 13 mounted at a central portion of the vehicle body 1, and the center roller unit 23 guided along the center rail 13. Referring to FIGS. 1 and 3, the center rail 13 may extend from a rear edge of the door aperture 3 in the longitudinal direction of the vehicle. The center roller unit 23 may be pivotally mounted at a central portion of the vehicle door 5. In particular, the center roller unit 23 may be mounted in a position adjacent to the rear end of the vehicle door 5. The center roller unit 23 may be guided along the center rail 13.

Figure 12:
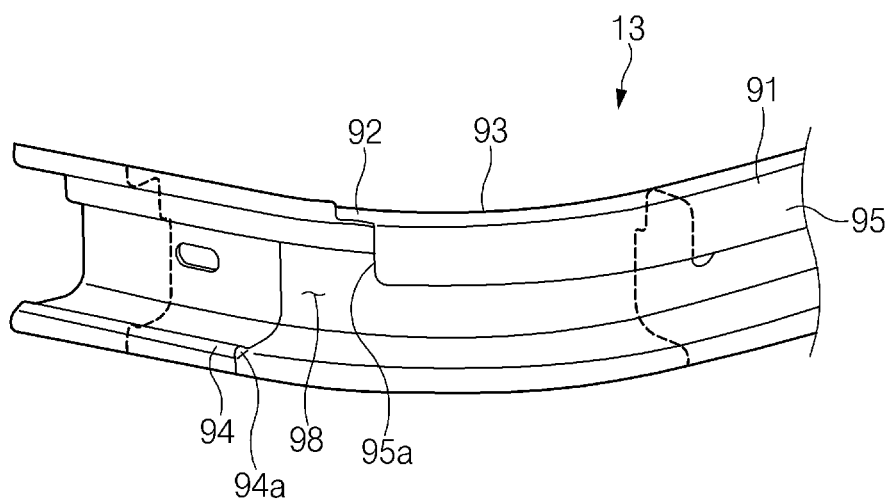
FIG. 12 illustrates a perspective view of a center rail in a vehicle door opening and closing apparatus according to an exemplary embodiment of the present disclosure.

Referring to FIG. 12, the center rail 13 may include a sliding guide 91 that extends straight in the longitudinal direction of the vehicle, and a swing guide 92 that extends from the sliding guide 91 toward the interior side of the vehicle. The swing guide 92 may be bent at a predetermined angle with respect to the sliding guide 91 through a bending portion 93, and the bending portion 93 may be curved at a predetermined radius.

Figure 13:
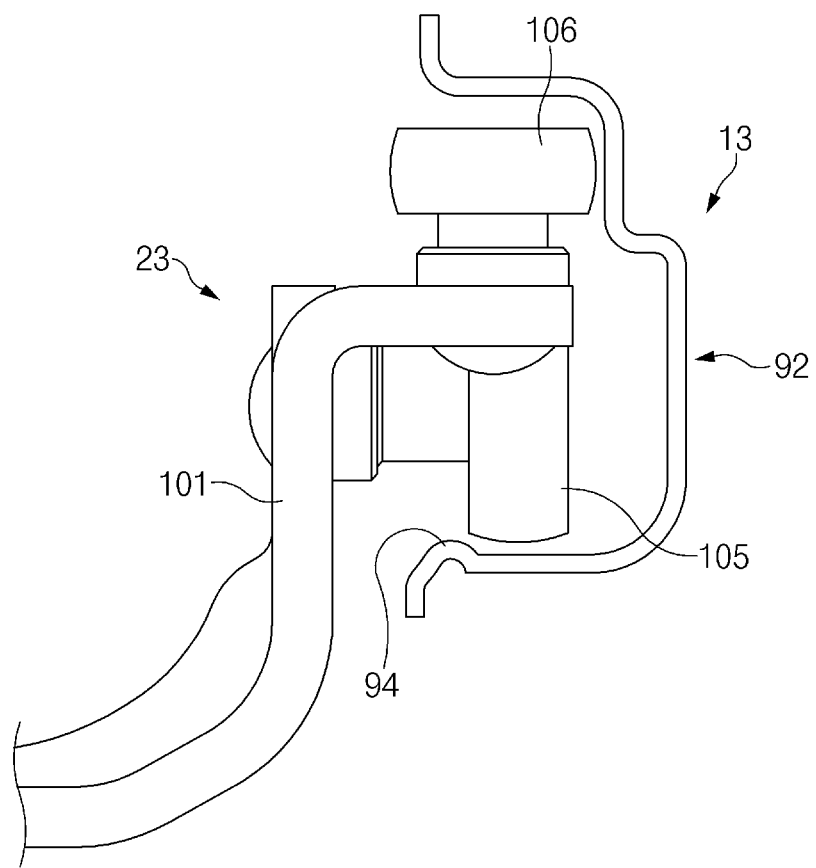
FIG. 13 illustrates a cross-sectional view of a swing guide of a center rail according to an exemplary embodiment of the present disclosure.
Figure 14:
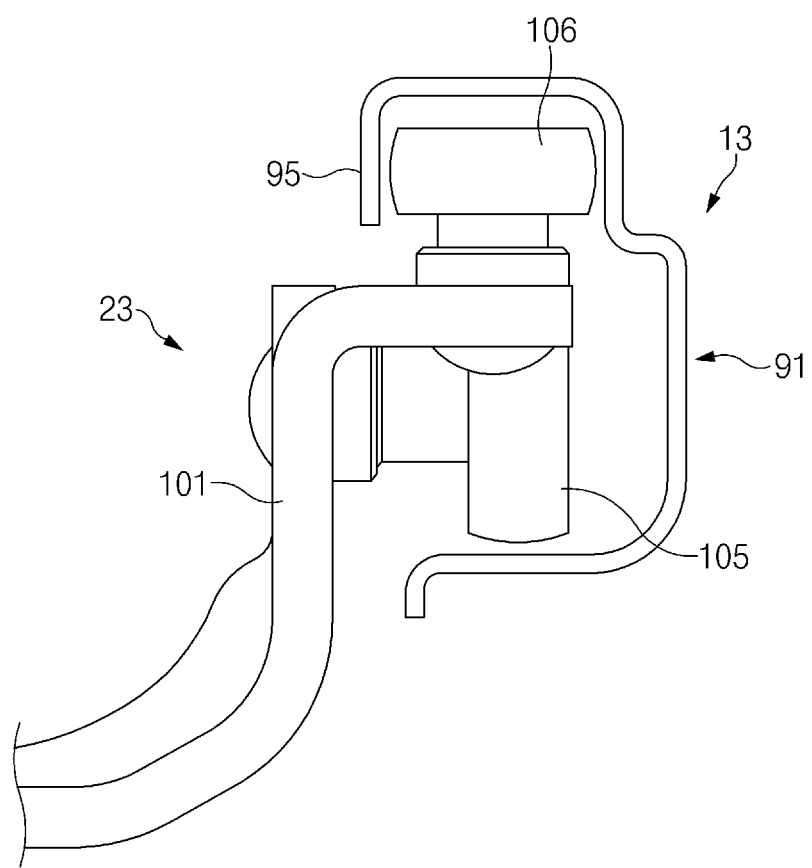
FIG. 14 illustrates a cross-sectional view of a sliding guide of a center rail according to an exemplary embodiment of the present disclosure.
Figure 15:
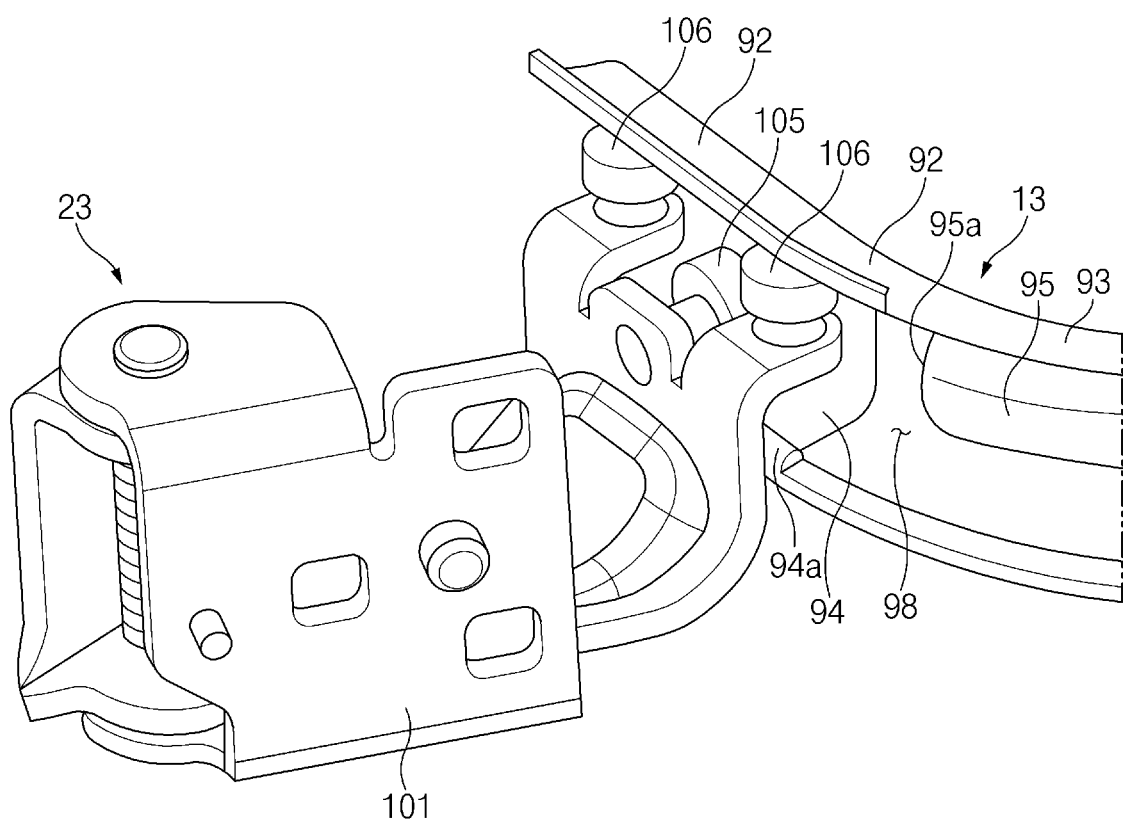
FIG. 15 illustrates a structure in which a center roller unit is held in a swing guide of a center rail according to an exemplary embodiment of the present disclosure.

Referring to FIGS. 13 to 15, the center roller unit 23 may include a roller bracket 101 and rollers 105 and 106 rotatably mounted on the roller bracket 101. The roller bracket 101 may be pivotally mounted at the central portion of the vehicle door 5. The rollers 105 and 106 may roll along the center rail 13. As illustrated in FIG. 15, a middle roller 105 and two side rollers 106 disposed on both sides of the middle roller 105 may be rotatably mounted on the roller bracket 101. A rotation axis of the middle roller 105 may be perpendicular to a rotation axis of the side roller 106. When the vehicle door 5 slides in the longitudinal direction of the vehicle as the sliding mode is selected, the sliding guide 91 may guide the center roller unit 23.

Referring to FIGS. 12 and 14, the sliding guide 91 may include a stopper wall 95 that prevents the rollers 105 and 106 of the center roller unit 23 from being separated from the sliding guide 91. The stopper wall 95 may extend along a length of the sliding guide 91 and a length of the bending portion 93. Additionally, the stopper wall 95 may protrude vertically downward from the top of the sliding guide 91. As the stopper wall 95 closes an upper area of the sliding guide 91 and an upper area of the bending portion 93, the rollers 105 and 106 of the center roller unit 23 may be prevented from moving away from the sliding guide 91 toward the exterior side of the vehicle as illustrated in FIG. 14.

When the vehicle door 5 is opened and closed in the swing mode as the swing mode is selected, the swing guide 92 may guide the rollers 105 and 106 of the center roller unit 23 to be released from the center rail 13. An exterior side of the swing guide 92 may be entirely opened toward the exterior space of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along a swing trajectory T1 or T2, the middle roller 105 of the center roller unit 23 may be guided along the guide projection 94 as illustrated in FIG. 13.

Figure 16:
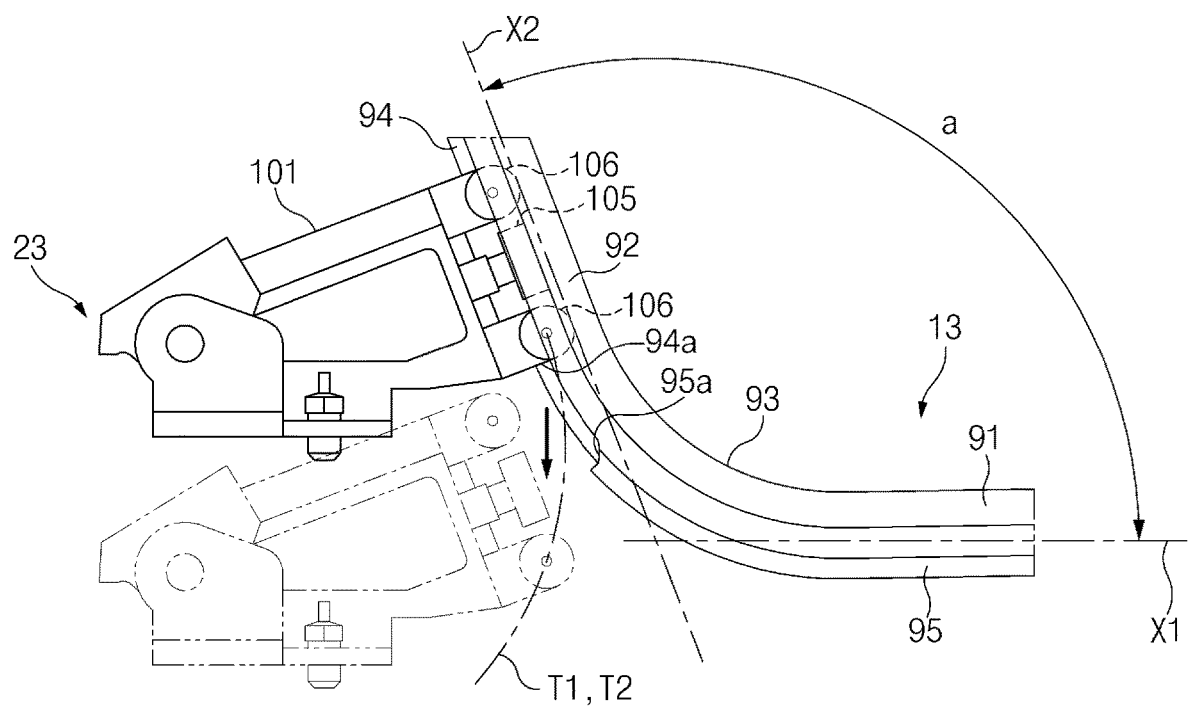
FIG. 16 illustrates an operation in which a center roller unit is released from a swing guide of a center rail according to an exemplary embodiment of the present disclosure.

A front end 95a of the stopper wall 95 of the sliding guide 91 and a rear end 94a of the guide projection 94 may be positioned to prevent interference with the swing trajectory of the vehicle door 5. In addition, as illustrated in FIG. 16, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, to more easily release the rollers 105 and 106 of the center roller unit 23 from the swing guide 92 of the center rail 13 or easily hold the rollers 105 and 106 in the swing guide 92 of the center rail 13.

The center rail 13 may include a space 98 that allows the rollers 105 and 106 of the center roller unit 23 to be released from the center rail 13 or be held in the center rail 13 when the vehicle door 5 swings in the swing mode. The space 98 may be defined between the front end 95a of the stopper wall 95 and the rear end 94a of the guide projection 94 as the front end 95a of the stopper wall 95 and the rear end 94a of the guide projection 94 are spaced apart from each other. Thus, there is no interference when the rollers 105 and 106 of the center roller unit 23 are released from the center rail 13 or are held in the center rail 13 in the swing mode.

FIGS. 1 to 16 illustrate the vehicle door opening and closing apparatus according to the exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 17:
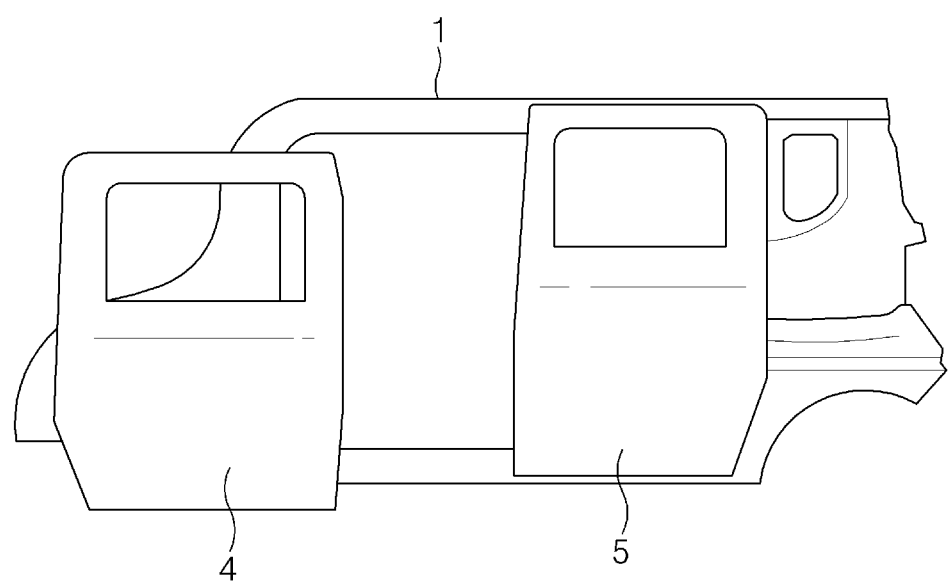
FIG. 17 illustrates a vehicle door opening and closing apparatus according to an exemplar)/embodiment of the present disclosure, which is applied to a front door of a vehicle, in a state in which the front door is opened in sliding mode.
Figure 18:
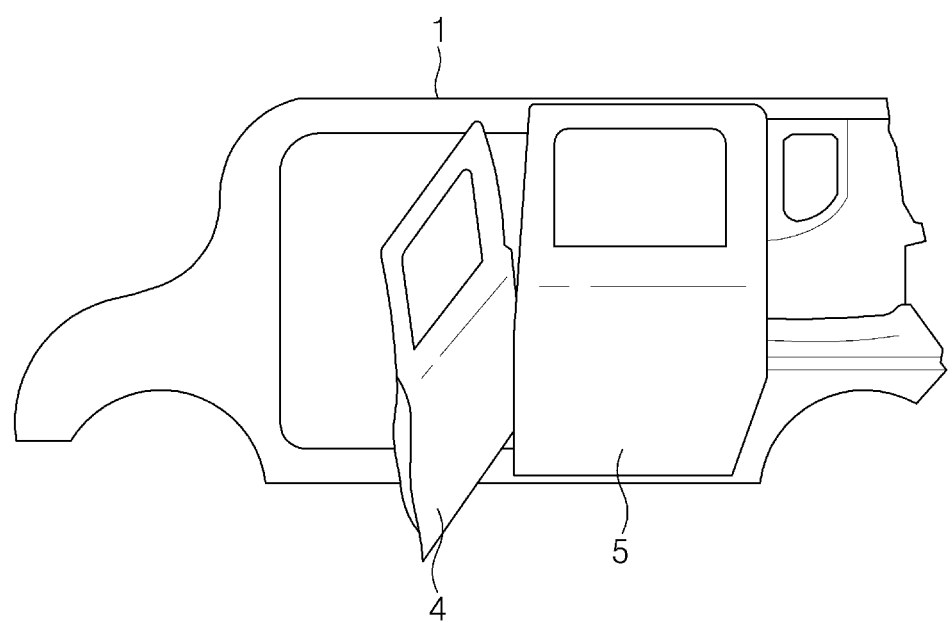
FIG. 18 illustrates a state in which the front door of FIG. 17 is opened in swing mode according to an exemplary embodiment of the present disclosure.
Figure 19:
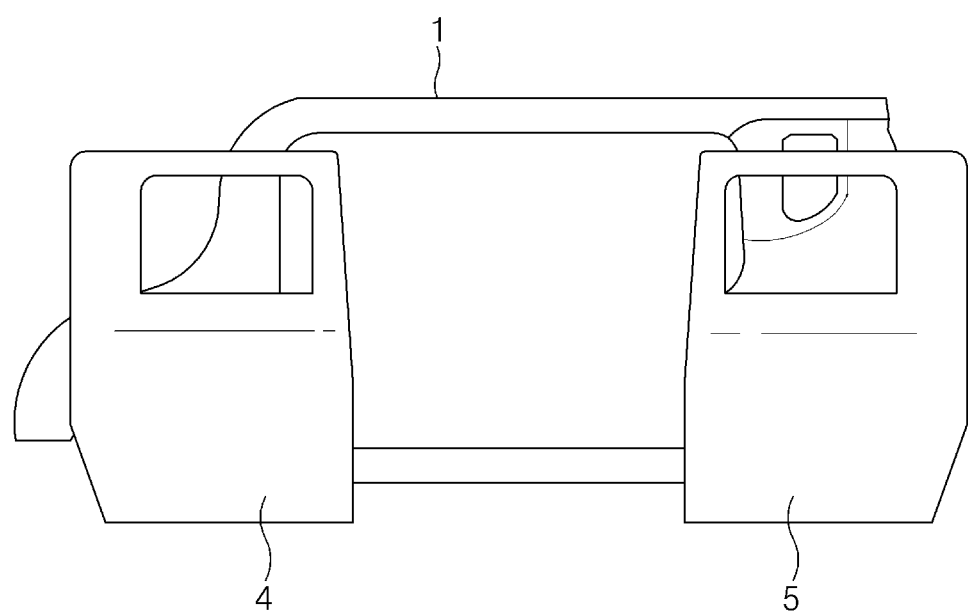
FIG. 19 illustrates a vehicle door opening and closing apparatus according to an exemplar)/embodiment of the present disclosure, which is applied to a front door and a rear door of a vehicle, in a state in which the front door and the rear door are opened in sliding mode.
Figure 20:
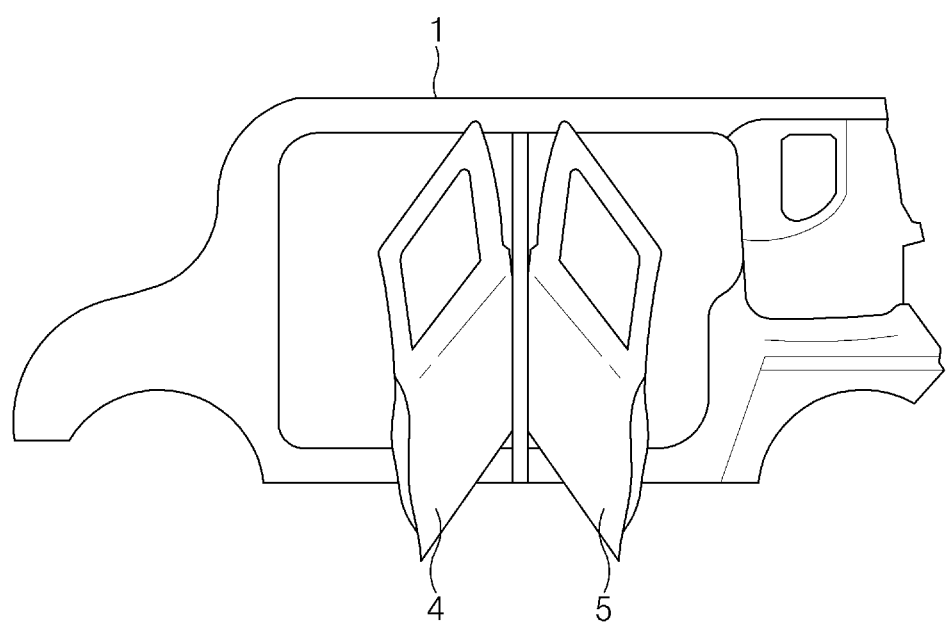
FIG. 20 illustrates a state in which the front door and the rear door of FIG. 19 are opened in swing mode according to an exemplary embodiment of the present disclosure.

FIGS. 17 and 18 illustrate the vehicle door opening and closing apparatus according to exemplary embodiments of the present disclosure applied to the front door 4. FIG. 17 illustrates a state in which the front door 4 is opened in the sliding mode, and FIG. 18 illustrates a state in which the front door 4 is opened in the swing mode. FIGS. 19 and 20 illustrate the vehicle door opening and closing apparatus according to exemplary embodiments of the present disclosure applied to both the front door 4 and the rear door 5. FIG. 19 illustrates a state in which the front door 4 and the rear door 5 are opened in the sliding mode, and FIG. 20 illustrates a state in which the front door 4 and the rear door 5 are opened in the swing mode.

As set forth above, according to exemplary embodiments of the present disclosure, as the first mounting member and the second mounting member may be selectively rotated by the link mechanism, the movement path of the vehicle door may be selectively determined as any one of the sliding path and the swing path. The sliding path may be a path along which the vehicle door slides in the longitudinal direction of the vehicle body, and the swing path may be a path along which the vehicle door swings. The vehicle door opening and closing apparatus according to exemplary embodiments of the present disclosure may allow the vehicle door to open and close in one mode selected from the sliding mode that corresponds to the sliding path and the swing mode that corresponds to the swing path, thereby meeting the needs of customers such as convenience and diversity. In addition, it may allow the vehicle door to open and close in one mode selected from two or more modes by taking the customer's situation and environment into consideration, thereby improving convenience and quality.

In terms of vehicle specifications, the vehicle door opening and closing structure may be standardized, regardless of vehicle models. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A link mechanism for a vehicle door, comprising:
 a body including a first end portion facing a vehicle body and a second end portion facing a vehicle door;
 a first mounting member mounted on the vehicle body, and rotatably connected to the first end portion of the body through a first shaft;
 a second mounting member mounted on the vehicle door, and rotatably connected to the second end portion of the body through a second shaft; and
 a rotation restricting unit configured to selectively restrict a rotation of the second mounting member;
 wherein the rotation restricting unit includes a restricting element that releasably holds the second mounting member, and
 wherein the restricting element moves between an engaging position in which the restricting element directly contacts the second mounting member and a release position in which the restricting element releases the second mounting member.

2. The link mechanism according to claim 1, wherein the restricting element is pivotally mounted on the body by a pivot pin, and the restricting element is biased toward the engaging position by a torsional biasing element.

3. The link mechanism according to claim 2, wherein the second mounting member includes a plurality of recesses, and the restricting element includes a plurality of projections releasably fitted into the plurality of recesses.

4. The link mechanism according to claim 1, wherein the body further includes a first damper and a second damper which are spaced apart from each other to restrict a range of rotation of the second mounting member.

5. The link mechanism according to claim 1, wherein the restricting element is slidably mounted on the body to advance toward the second mounting member or be reversed from the second mounting member, and the restricting element is biased toward the engaging position by a longitudinal biasing element.

6. A vehicle door opening and closing apparatus, comprising:
   a vehicle door;
   a rail mounted on a vehicle body; and
   a link mechanism that connects the vehicle body and the vehicle door, and allows the vehicle door to open and close in one mode selected from sliding mode, in which the vehicle door slides along the rail, and swing mode, in which the vehicle door swings in a predetermined position of the rail,
   wherein the link mechanism includes:
   a body having a first end portion facing the vehicle body and a second end portion facing the vehicle door;
   a first mounting member moving along the rail of the vehicle body, and rotatably connected to the first end portion of the body through a first shaft;
   a second mounting member mounted on the vehicle door, and rotatably connected to the second end portion of the body through a second shaft; and
   a rotation restricting unit configured to selectively restrict a rotation of the second mounting member,
   wherein the rotation restricting unit includes a restricting element that releasably holds the second mounting member, and
   wherein the restricting element moves between an engaging position in which the restricting element directly contacts the second mounting member and a release position in which the restricting element releases the second mounting member.

7. The vehicle door opening and closing apparatus according to claim 6, wherein:
   the link mechanism has a rotation axis and includes a hold lock,
   the link mechanism is releasably held in the predetermined position of the rail by the hold lock,
   the vehicle door swings around the rotation axis when the link mechanism is held in the predetermined position of the rail by the hold lock, and
   the vehicle door slides along the rail when the link mechanism is released by the hold lock.

8. The vehicle door opening and closing apparatus according to claim 7, wherein the rotation axis is defined by the second shaft.

9. The vehicle door opening and closing apparatus according to claim 7, wherein the hold lock is mounted on the body of the link mechanism.

10. The vehicle door opening and closing apparatus according to claim 6, wherein the first mounting member is movably mounted on the vehicle body through rollers, the rollers are rotatably mounted on the first mounting member, and the rollers roll along the rail.

11. The vehicle door opening and closing apparatus according to claim 6, wherein the body has a pivot lug that protrudes from the first end portion toward the first mounting member, and the pivot lug is connected to the first mounting member through the first shaft.

12. The vehicle door opening and closing apparatus according to claim 6, wherein the first end portion of the body includes a first restricting surface and a second restricting surface which restrict a range of rotation of the first mounting member, and the first restricting surface and the second restricting surface intersect at a predetermined angle.

* * * * *